(12) United States Patent
Makino et al.

(10) Patent No.: US 11,531,142 B2
(45) Date of Patent: Dec. 20, 2022

(54) OPTICAL MEMBER AND METHOD FOR MANUFACTURING OPTICAL MEMBER

(71) Applicant: CANON KABUSHIKI KAISHA, Tokyo (JP)

(72) Inventors: Kenji Makino, Kawasaki (JP); Toshinao Tatsuno, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 16/885,092

(22) Filed: May 27, 2020

(65) Prior Publication Data
US 2020/0379144 A1 Dec. 3, 2020

(30) Foreign Application Priority Data

May 31, 2019 (JP) .............. JP2019-103232
Mar. 30, 2020 (JP) .............. JP2020-060798

(51) Int. Cl.
*G02B 1/115* (2015.01)
*G02B 1/111* (2015.01)
*G02B 1/118* (2015.01)

(52) U.S. Cl.
CPC .............. *G02B 1/115* (2013.01); *G02B 1/111* (2013.01); *G02B 1/118* (2013.01)

(58) Field of Classification Search
CPC ........... G02B 1/11; G02B 1/111; G02B 1/115; G02B 1/118; G02B 1/18
See application file for complete search history.

(56) References Cited

U.S. PATENT DOCUMENTS

| | | | |
|---|---|---|---|
| 2003/0057448 A1* | 3/2003 | Fujinawa | G02B 1/115 257/200 |
| 2009/0168184 A1* | 7/2009 | Yamada | G02B 1/115 359/601 |
| 2010/0027123 A1* | 2/2010 | Imai | G02B 1/115 428/317.9 |
| 2017/0073524 A1* | 3/2017 | Nakayama | C09D 1/00 |
| 2017/0315269 A1* | 11/2017 | Ogane | C03C 17/007 |
| 2018/0259680 A1* | 9/2018 | Nakayama | C09D 7/61 |

FOREIGN PATENT DOCUMENTS

| | | |
|---|---|---|
| JP | 11-84102 A | 3/1999 |
| JP | 2008-197414 A | 8/2008 |
| JP | 2009-527780 A | 7/2009 |
| JP | 2017-149589 A | 8/2017 |

OTHER PUBLICATIONS

RefractiveIndex.Info (Refractive index of Ta2O5 (Tantalum pentoxide)—Gao, available at: https://refractiveindex.info?shelf=main&book=Ta2O5&page=Gao. Retrieved on Feb. 10, 2022). (Year: 2012).*

* cited by examiner

*Primary Examiner* — Kimberly N. Kakalec
(74) *Attorney, Agent, or Firm* — Canon U.S.A., Inc., IP Division

(57) ABSTRACT

An optical member that has excellent antireflection properties and that can maintain antifogging properties over a long term, and a method for manufacturing an optical member are provided. The optical member includes, in sequence, a substrate, a porous layer, and a multilayered antireflection layer. The ratio $n/n_0$ is 0.85 or more and 0.95 or less, where n represents a refractive index of a layer having the highest refractive index among layers included in the antireflection layer and $n_0$ represents a refractive index of a compound constituting the layer having the highest refractive index at a theoretical density.

24 Claims, 7 Drawing Sheets

OPTICAL MEMBER AND METHOD FOR MANUFACTURING OPTICAL MEMBER

BACKGROUND OF THE INVENTION

Field of the Invention

The present disclosure relates to an optical member having excellent antifogging properties and optical properties, and a method for manufacturing an optical member.

Description of the Related Art

When surfaces of transparent substrates such as glass and plastic substrates are at a temperature equal to or lower than a dew point, microdroplets adhere to the substrate surfaces and scatter transmitted light, thereby degrading the transparency and "fogging" the substrate surfaces. In order to prevent such fogging in optical parts, a technology of improving the wettability of the optical part surfaces to water so as to suppress generation of water droplets has been developed.

Moreover, not only the antifogging properties but also antireflection properties are often required for the optical parts. PCT Japanese Translation Patent Publication No. 2009-527780 discloses an optical element in which an antireflection coating, which is prepared by alternately stacking high-refractive-index layers and low-refractive-index layers, is disposed on a water absorbent polymer layer (absorbent layer) and holes that extend to the water absorbent polymer layer are formed in the antireflection coating by using a laser. Such an optical element has high antireflection properties due to the antireflection coating, and also has antifogging properties since the condensate water is absorbed by the water absorbent polymer layer through the holes formed in the antireflection coating.

In the optical element disclosed in PCT Japanese Translation Patent Publication No. 2009-527780, holes that pass moisture are formed in the antireflection coating at intervals of about 20 μm. Thus, the path in which the moisture travels between the exterior and the water absorbent polymer layer is limited, and thus the moisture absorbed by the absorbent layer is not easily released to the exterior. Consequently, as the optical element is repeatedly exposed to an environment that requires antifogging properties, the amount of moisture retained in the absorbent layer exceeds the water absorbing capacity of the absorbent layer, and thus the optical element can no longer maintain the antifogging properties.

In order to facilitate release of the moisture absorbed by the absorbent layer to the exterior, the density of holes formed in the antireflection coating must be increased. However, since holes are formed by using a laser, increasing the hole density also increases the length of time and the cost needed to manufacture the optical element.

SUMMARY OF THE INVENTION

An optical member according to an aspect of the present disclosure includes, in sequence, a substrate, a porous layer, and a multilayered antireflection layer, in which a ratio $n/n_0$ is 0.85 or more and 0.95 or less, where n represents a refractive index of a layer having the highest refractive index among layers included in the antireflection layer and $n_0$ represents a refractive index of a compound constituting the layer having the highest refractive index at a theoretical density.

A method for manufacturing an optical member according to another aspect of the present disclosure includes a step of forming a porous layer by supplying, onto a substrate, a liquid containing particles, a component that forms a binder, and a solvent; and a step of forming a multilayered antireflection layer on the porous layer, in which, in the step of forming an antireflection layer, a layer having the highest refractive index among layers included in the antireflection layer is formed by a vapor deposition process so that a ratio $n/n_0$ is 0.85 or more and 0.95 or less, where n represents the refractive index of the layer having the highest refractive index among layers included in the antireflection layer and $n_0$ represents a refractive index of a compound constituting the layer having the highest refractive index at a theoretical density.

Further features of the present disclosure will become apparent from the following description of exemplary embodiments with reference to the attached drawings.

DESCRIPTION OF THE EMBODIMENTS

Figure 1:
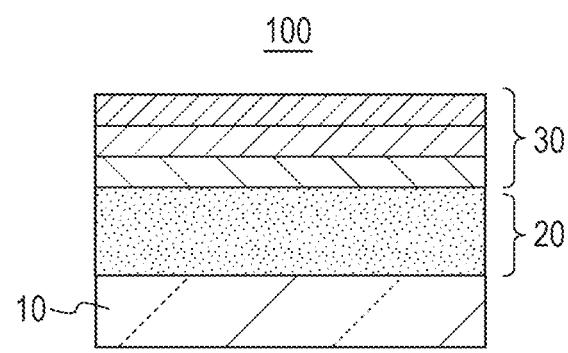
FIG. 1 is a schematic view of one embodiment of an optical member of the present disclosure.

The present disclosure will now be described in detail.
Optical Member
FIG. 1 is a schematic diagram illustrating one embodiment of an optical member of the present disclosure.

An optical member 100 of the present disclosure includes a substrate 10, a moisture-retaining layer 20 on the substrate 10, and an antireflection layer 30 on the moisture-retaining layer 20. The antireflection layer 30 is a layered body in which layers having different refractive indices are stacked. Of the layers included in the antireflection layer 30, at least the layer with the highest refractive index includes pores and is in a state in which the density thereof is smaller than the theoretical density of the compound constituting the layer.

Due to this feature, fogging does not occur even when the optical member 100 of the present disclosure is exposed to an environment that can cause condensation. Thus, the optical member 100 of the present disclosure is applicable to a wide range of usages, including windowpanes, mirrors, lenses, and transparent films.

Substrate

Glass, resin, and the like can be used as the material for the substrate 10. The substrate 10 may have any shape, and may have a flat surface, a curved surface, a recessed surface, or a protruding surface, or a film shape.

Examples of the glass include inorganic glass that contains zirconium oxide, titanium oxide, tantalum oxide, niobium oxide, hafnium oxide, lanthanum oxide, gadolinium oxide, silicon oxide, calcium oxide, barium oxide, sodium oxide, potassium oxide, boron oxide, aluminum oxide, or the like. A glass substrate can be formed by grinding and polishing, mold forming, float forming, or the like.

Examples of the resin include polyethylene terephthalate, polyethylene naphthalate, triacetyl cellulose, acrylic resin, polycarbonate, cycloolefin polymer, and polyvinyl alcohol.

In order to improve the strength and flatness of the substrate 10, improve the adhesion of the film in contact with the substrate 10, or impart functions such as antireflection and antiglare functions, the surface of the substrate 10 may be washed or polished, or an adhesive layer, a hard coat layer, or a refractive index-adjusting layer may be formed thereon.

Moisture-Retaining Layer

The moisture-retaining layer 20 may be any layer that can absorb and retain moisture; however, a porous layer, in particular, an inorganic porous layer, is more favorable than a water absorbent polymer layer since the porous layer has high strength and does not swell by absorbing water. When the moisture-retaining layer 20 is an inorganic porous layer, distortion does not occur in an image obtained through the optical member 100 even when the layer absorbs water. Thus, examples of the particularly suitable optical applications include optical lenses, optical mirrors, optical filters, and eye pieces for imaging systems and projection systems, and flat covers and dome covers for outdoor cameras and surveillance cameras.

The pores included in the porous layer may be in communication with one another three dimensionally. When there are such pores, the moisture that has entered through the antireflection layer 30 can be retained by using all of the pores included in the film, and thus high water retaining properties can be exhibited.

The average pore diameter of the pores included in the porous layer may be 3 nm or more and 50 nm or less as determined by pore distribution measurement by a nitrogen gas adsorption method. As long as the average pore diameter is 3 nm or more, the movement of air and moisture in the moisture-retaining layer 20 is smooth, and thus sufficient antifogging properties can be exhibited. As long as the average pore diameter is 50 nm or less, pores having a diameter larger than 100 nm causing light scattering are few, and thus transparency can be maintained. The pore diameter is more preferably 5 nm or more and 20 nm or less.

The amount of the pores included in the porous layer (moisture-retaining layer 20) can be determined as a pore volume by a nitrogen gas adsorption method. The pore volume may be 0.1 $cm^3/g$ or more and 1.0 $cm^3/g$ or less. When the pore volume is 0.1 $cm^3/g$ or more, an amount of water sufficient to obtain antifogging properties can be retained in the moisture-retaining layer 20. As long as the pore volume is 1.0 $cm^3/g$ or less, sufficient scratch resistance is obtained without degrading the hardness of the skeleton. The pore volume is more preferably 0.3 $cm^3/g$ or more and 0.6 $cm^3/g$ or less.

The thickness of the moisture-retaining layer 20 can be appropriately designed according to the required antifogging properties, and may be 0.2 μm or more and 5 μm or less. As long as the thickness is 0.2 μm or more and 5 μm or less, low manufacturing cost and antifogging properties required of general optical members can both be achieved.

A method for manufacturing the moisture-retaining layer 20 can be a wet method since the layer can be formed at low cost. When the moisture-retaining layer 20 is an inorganic porous layer containing a metal oxide, a metal oxide precursor prepared by a sol-gel method or a dispersion liquid of metal oxide particles is used as the liquid for forming the film.

Antireflection Layer

The antireflection layer 30 is a transparent layered body formed of multiple layers having different refractive indices, and has antireflection properties that suppress reflection at the interface of in-coming and out-going light in the optical member and moisture permeability that enables movement of moisture between the exterior and the moisture-retaining layer 20. As the antireflection layer 30, a layered body obtained by stacking an appropriate combination selected from high-refractive-index layers, intermediate-refractive-index layers, and low-refractive-index layers according to the design is used. In order to reduce the difference in refractive index between the antireflection layer 30 and air to suppress reflection, a low-refractive-index layer may be disposed at the interface between the antireflection layer 30 and air, in other words, at the position farthest from the substrate. In the present disclosure, when the antireflection layer includes multiple layers, the terms "high-refractive-index layer", "intermediate-refractive-index layer", "low-refractive-index layer" may indicate the magnitude of the relative refractive indices between these layers. Roughly speaking, a layer having a refractive index of 1.8 or more corresponds to a high-refractive-index layer, a layer having a refractive index of 1.4 or more and less than 1.8 corresponds to an intermediate-refractive-index layer, and a layer having a refractive index of less than 1.4 corresponds to a low-refractive-index layer; however, this is not limiting. In the present disclosure, "transparent" means that the transmittance of visible light (400 nm to 760 nm) is 70% or more, and the "refractive index" is a value (nd) for a sodium d line (wavelength: 589.3 nm).

The thickness of each of the layers included in the antireflection layer 30 can be 10 nm or more and 200 nm or less. When the thickness of each layer is within this range, reflection of visible light in a wide wavelength range can be reduced. In order to suppress reflectance in a wide wavelength range, the number of layers stacked is preferably 2 or more and more preferably 3 or more.

The refractive index of a film is determined by the composition and density of the compound constituting the film. This is because the refractive index of a film as a whole is decreased by the presence of air having nd=1.0 in the pores in the film. In other words, when the composition is the same, the denser the film, the higher the refractive index; and the sparser the film, the lower the refractive index.

Each of the layers constituting the antireflection layer 30 is typically formed by a vapor deposition method that involves heating the substrate to about several hundred ° C., and thus the state of each layer is close to the theoretical density. This can be confirmed since the refractive index measured from the thus-prepared film is substantially the same as the theoretical density (the nominal value of the raw material used for forming the film).

A high-refractive-index layer in a state close to the theoretical density is assumed to be a dense film with a high density, and it is confirmed that an actual high-refractive-index layer suppresses permeation of moisture. When the antireflection layer 30 includes a high-refractive-index layer in a state close to the theoretical density, the movement of moisture between the exterior and the moisture-retaining layer 20 is obstructed by the high-refractive-index layer, and antifogging properties are no longer obtained.

It is confirmed that an intermediate-refractive-index layer and a low-refractive-index layer permeate some moisture although they are the films in a state close to the theoretical density, although this depends on the raw material to be used.

Thus, in the present disclosure, among the layers included in the antireflection layer 30, at least the layer having the highest refractive index (high-refractive-index layer) is formed as a film having a structure that has pores inside and allows smooth passage of moisture. When the layer having the highest refractive index has pores, the refractive index there of is lower than the refractive index at a theoretical density; however, by adjusting the porosity, a high refractive index required for the antireflection layer design and the moisture permeability required for the antireflection layer can both be achieved.

The layer having pores within the film can be formed by unheated deposition, oblique deposition, a film forming method with controlled gas (such as oxygen) introduction pressure and substrate temperature, or the like by appropriately adjusting the deposition conditions. Unheated deposition is a film forming method that involves performing vapor deposition without heating the substrate. Oblique deposition is a film forming method that involves forming a film on a surface of a substrate arranged to be oblique with respect to the direction in which the vapor deposition particles travel.

The film formed by this deposition method includes very fine pores, and it is difficult to confirm presence of the pores by a simple observation method such as SEM. Thus, the extent to which the pores are present in each of layers in the antireflection layer 30 can be checked by comparing the sputter etching rate of the layer to be evaluated and the sputter etching rate of a reference sample at a theoretical density having substantially the same composition as the layer to be evaluated.

First, the conditions under which the layer to be evaluated is sputter-etched are set. For the etching conditions, the accelerating voltage for the ions that collide with the surface and the etching time are determined so that the layer to be evaluated can be etched by multiple times of etching.

After performing etching once under the set etching conditions, elemental analysis is performed by X-ray photoelectron spectroscopy (XPS) to identify the composition of the etched portion and to check in which layer the etched part is included. Such etching and elemental analysis are alternately performed, and the etching thickness per one etching operation is calculated from the number of times etching is performed until a new layer appears, and the physical thickness of the layer. The result is assumed to be the etching rate R. The etching conditions may be set so that the etching rate R for the layer to be evaluated, in other words, the high-refractive-index layer, is 2 to 10 nm.

The physical thickness of the layer can be determined by slicing stacked layers in the optical member by using an electron beam machining apparatus so as to expose a cross section, and observing the cross section with a scanning transmission electron microscope (STEM).

The reference sample is either a film formed by a vacuum deposition method such that substantially the same composition as the layer to be evaluated is obtained and that substantially the same refractive index as that at a theoretical density is achieved, or a sputtering target used to deposit a film having substantially the same composition as the layer to be evaluated. The reference sample is also etched under the same etching conditions as those for the layer to be evaluated, and the etching rate $R_0$ is determined.

As long as the ratio $R_0/R$ of the etching rate $R_0$ to the etching rate R is less than 1, it is clear that the layer to be evaluated includes more pores than there are in the reference sample, in other words, than there are in the state at a theoretical density.

$R_0/R$ is preferably 0.75 or more and 0.90 or less, and more preferably 0.80 or more and 0.90 or less. As long as $R_0/R$ is 0.75 or more, a skeleton sufficient for maintaining the strength without greatly impairing the refractive index inherent to the material can be formed. As long as $R_0/R$ is 0.90 or less, pores necessary to yield moisture permeability can be included.

The extent to which the pores are present in each of the layers in the antireflection layer 30 can also be checked by comparing the refractive index n of the layer to be evaluated and the refractive index (theoretical refractive index) $n_0$ of the compound constituting the layer to be evaluated. Here, the refractive index n and the theoretical refractive index $n_0$ are refractive indices at an optical wavelength of 589 nm.

The refractive index n of the layer to be evaluated is confirmed by optical analysis of a measurement results of a spectroscopic ellipsometer or the reflectance. The thickness of the layer needed for the optical analysis may be determined as a physical thickness of the layer determined by slicing stacked layers in the optical member by using an electron beam machining apparatus to expose a cross section and observing the cross sections with a scanning transmission electron microscope (STEM). The refractive index in a theoretical density state for substantially the same composition as the layer to be evaluated may be a refractive index measured from a film formed by a vacuum deposition method such that substantially the same composition as the layer to be evaluated is obtained and that substantially the same refractive index as that at a theoretical density is achieved. Alternatively, the high-refractive-index layer may be etched, elemental analysis may be performed thereon by X-ray photoelectron spectroscopy (XPS) to identify the composition of the compound constituting the layer, and the nominal refractive index of that compound may be used as the refractive index at a theoretical density.

As long as the ratio $n/n_0$ of the refractive index n of the layer to be evaluated to the theoretical refractive index $n_0$ is less than 1, it is clear that the layer to be evaluated includes more pores than there are in the reference sample.

The refractive index ratio $n/n_0$ is preferably 0.85 or more and 0.95 or less, and more preferably 0.90 or more and 0.95 or less. As long as $n/n_0$ is 0.85 or more, a skeleton sufficient for maintaining the strength without greatly impairing the refractive index inherent to the material can be formed. As long as $n/n_0$ is 0.95 or less, pores necessary to exhibit moisture permeability can be included.

As described above, the antireflection layer 30 of the present disclosure includes a high-refractive-index layer that is not in a dense state close to the theoretical density but in a sparse state with fine pores. Thus, even when there is a high-refractive-index layer, the movement of moisture between the exterior and the moisture-retaining layer 20 is not obstructed.

Thus, since moisture can move between the exterior and the moisture-retaining layer 20 in the optical member of the present disclosure, moisture can be retained in the moisture-retaining layer 20 or can be released from the moisture-retaining layer 20 depending on the humidity, and thus, high antifogging properties can be exhibited repeatedly.

In the present disclosure, a film containing an inorganic material, such as magnesium fluoride ($MgF_2$, nd=1.38) or calcium fluoride ($CaF_2$, nd=1.43), can be used as a low-refractive-index layer.

A film containing an inorganic material, such as silicon oxide ($SiO_2$, nd=1.46) or aluminum oxide ($Al_2O_3$, nd=1.77), can be used as an intermediate-refractive-index layer.

Examples of the high-refractive-index layer include films containing inorganic materials, such as zirconium oxide ($ZrO_2$, nd=2.13), titanium oxide ($TiO_2$, nd=2.52 to 2.72), tantalum oxide ($Ta_2O_5$, nd=2.17), niobium oxide ($Nb_2O_5$, nd=2.32), and hafnium oxide ($Hf_2O_5$, nd=1.91). The refractive index of the high-refractive-index layer may be adjusted by selecting two metal oxides from these metal oxides, or by mixing at least one metal oxide selected from these metal oxides with other metal oxides.

These metal oxide layers can be formed by a vacuum deposition method such as vapor deposition or sputtering, or a wet film forming method such as dip coating or spin coating. A vacuum deposition method such as vapor deposition or sputtering may be employed since the refractive index and stress of the layer can be adjusted by adjusting the gas introduced during film formation or adjusting the deposition method.

In order for the antireflection layer 30 to maintain the antireflection properties, the change in refractive index caused by moisture adsorption is preferably small. Assuming that the moisture adsorption to the pores is compliant with the Kelvin equation, the humidity at which that moisture condensation progresses inside the porous layer and adsorption occurs shifts toward the high humidity side as the pores become larger in size. Since the pores in the antireflection layer 30 are smaller than the pores in the moisture-retaining layer, moisture adsorption starts in a low-humidity environment. In addition, since the pores in the antireflection layer 30 of the present disclosure are small, the pores retain little moisture, and the refractive index does not largely change despite water adsorption. Thus, even when the antireflection layer 30 includes pores, the change in refractive index caused by moisture adsorption inside the pores does not occur. Thus, the antireflection layer 30 of the present disclosure has a refractive index stable over a wide humidity range, and exhibits excellent properties as the antireflection layer.

Other Layers

Figure 2:
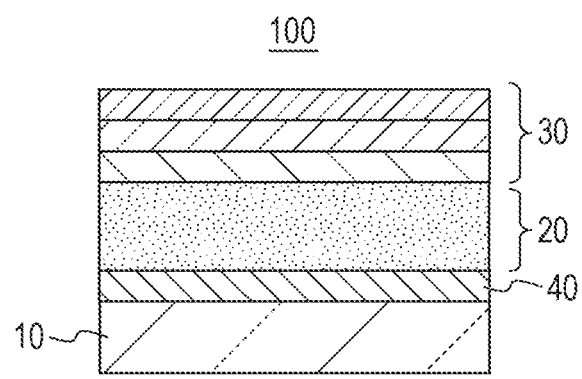
FIG. 2 is a schematic view of an optical member having an undercoat layer according to one embodiment of the optical member of the present disclosure.

In order to further improve the antireflection effects of the optical member, as illustrated in FIG. 2, an undercoat layer 40 may be disposed between the moisture-retaining layer 20 and the substrate 10 so as to reduce reflection that occurs at the interface between the moisture-retaining layer 20 and the substrate 10.

A single film having a refractive index between those of the moisture-retaining layer 20 and the substrate 10 may be formed as the undercoat layer 40. Alternatively, a layered body constituted by multiple layers with different refractive indices may be formed. The reflection can be further reduced by utilizing the interference within the undercoat layer 40.

The undercoat layer 40 can be formed by a vacuum deposition method such as a vapor deposition method or a sputtering method, or by a wet film forming method using a sol-gel solution, a particle dispersion liquid, or the like.

First Embodiment

Figure 3:
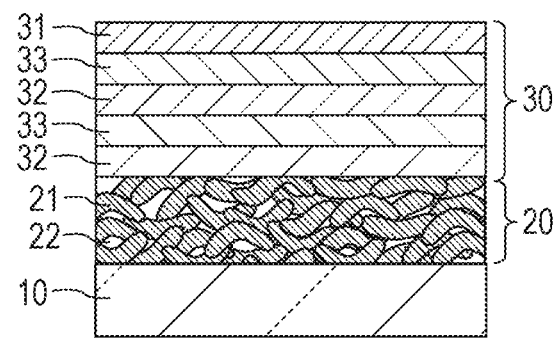
FIG. 3 is a schematic view of an optical member that includes a porous layer containing particles according to one embodiment of the optical member of the present disclosure.

FIG. 3 is a schematic diagram of an embodiment that uses, as the moisture-retaining layer 20, a porous layer formed by depositing particles 21. As illustrated in the drawing, two intermediate-refractive-index layers 32 and two high-refractive-index layers 33 are alternately stacked on the moisture-retaining layer 20, and a low-refractive-index layer 31 is stacked thereon in sequence, thereby constituting an antireflection layer 30 that includes a total of five layers. Pores 22 in the moisture-retaining layer 20 are in communication with one another from the interface with the substrate 10 to the interface with the antireflection layer 30.

The average pore diameter of the pores 22 may be 3 nm or more and 50 nm or less as determined by pore distribution measurement by a nitrogen gas adsorption method. As long as the average pore diameter is 3 nm or more, the movement of air and moisture into the moisture-retaining layer 20 is smooth, and thus sufficient antifogging properties can be obtained. As long as the average pore diameter is 50 nm or less, pores having a diameter larger than 100 nm causing light scattering are few, and thus transparency can be maintained. The pore diameter is more preferably 5 nm or more and 20 nm or less.

The amount of the pores 22 included in the porous layer (moisture-retaining layer 20) can be determined as a pore volume by a nitrogen gas adsorption method. The pore volume may be 0.1 $cm^3/g$ or more and 1.0 $cm^3/g$ or less. When the pore volume is 0.1 $cm^3/g$ or more, the amount of water sufficient to obtain antifogging properties can be retained in the moisture-retaining layer 20. As long as the pore volume is 1.0 $cm^3/g$ or less, sufficient strength is obtained without degrading the hardness of the skeleton. The pore volume is more preferably 0.3 $cm^3/g$ or more and 0.6 $cm^3/g$ or less.

The porous layer 20 may be a layer formed by a dispersion liquid of particles since the manufacturing cost is low.

The shape of the particles 21 can be any of various shapes, such as spherical, chain-like, disk-like, elliptical, rod-like, needle-like, and prismatic shapes. The particles may be spherical or chain-like since the film forming property is excellent, and thus porosity can be increased while achieving a sufficient film hardness. Moreover, a mixture of a plurality of types of particles with different shapes may be used.

The chain-like particles refer to aggregates of particles in which multiple particles are connected to each other in chains (also referred to as "strings") in a straight line or a bending line. The shape of the particles that shape the chain-like particles may be in a state in which individual particles are clearly observable or in a state in which the particles are fused to each other with collapsed shapes. The structure in which the particles are connected into chains is maintained even after the particles are formed into a film. Thus, compared to the case in which particles of other shapes are used, the gaps between the particles can be widened, and a moisture-retaining layer 20 having a large pore volume can be formed.

When the particles 21 are spherical, disk-like, or elliptical, the average particle size thereof may be 5 nm or more and 100 nm or less. As long as the average particle size is 5 nm or more, the compressive stress during the film deposition can be released, and cracks rarely occur in the moisture-retaining layer 20. As long as the average particle size is 100 nm or less, scattering of light caused by the size of particles rarely occurs, and thus a film with high transparency is obtained. The average particle size may be 10 nm or more and 60 nm or less.

When the particles 21 are particles with a shape having a short axis and a long axis, such as when the particles are chain-like, rod-like or needle-like, the average length of the short axis is preferably 5 nm or more and 40 nm or less and is more preferably 8 nm or more and 30 nm or less. When the average short axis length of the silicon oxide particles is less than 5 nm, the surface area of the particles 21 is excessively large, and thus there is a higher possibility of degradation of reliability caused by incorporation of moisture and chemical substances from the atmosphere. As long as the average short axis length is 40 nm or less, scattering of light caused by the size of particles rarely occurs. The long axis/short axis length ratio may be 3 or more and 12 or less. When the long axis/short axis length ratio is 3 or more, the effect of increasing the pore volume can be easily obtained, and when the ratio is 12 or less, scattering of light caused by the increase in the average pore diameter can be suppressed, and high transparency can be obtained. The long axis/short axis length ratio can be 4 or more and 10 or less.

The average particle size of the particles 21 is the average Feret diameter. This average Feret diameter can be measured by image-processing an observed transmission electron micrographic image. The image can be processed by using a commercially available image processing software such as image Pro PLUS (produced by Media Cybernetics, Inc.). In a particular image region, the contrast is appropriately adjusted as necessary, and the average Feret diameter of each particle is measured by particle measurement, and the average thereof is calculated to determine the average Feret diameter.

The particles 21 may be particles of single metal oxide mainly containing silicon oxide or zirconium oxide, or some of the atoms may be substituted with other atoms of other elements, such as Al, Ti, Zn, Zr, or B, or linked to an organic group.

In order to increase the strength (scratch resistance) of the moisture-retaining layer 20, the particles 21 may be bonded to one another. Examples of the method for bonding the particles 21 include a method of physically bonding the particles with a binder, and a method of chemically bonding the particles by surface-treating the particles 21.

Hereinafter, a method for manufacturing an optical member illustrated in FIG. 3 is described.

A method for manufacturing the optical member 100 according to the present disclosure includes a step of forming a moisture-retaining layer 20 on a substrate 10, and a step of forming an antireflection layer 30.

The step of forming a moisture-retaining layer 20 is not particularly limited as long as the aforementioned average pore diameter and the porosity are obtained, and may be performed by a vacuum deposition method or a wet film forming method. When the layer is deposited by a vacuum deposition method, a film having pores can be formed by controlling the gas (such as oxygen) introduction pressure or the substrate temperature or by employing an oblique deposition method. When the moisture-retaining layer 20 is formed by a wet method, a coating film is formed on a substrate by using a metal oxide precursor synthesized by a sol-gel method or the like or a dispersion liquid containing metal oxide particles, and drying the coating film at 15° C. to 200° C. The dispersion liquid containing a metal oxide precursor or metal oxide particles is not a limiting example, and a solution containing polymer particles may also be used.

The solvent that can be used in a sol-gel solution, a dispersion liquid containing particles, or a dispersion liquid containing polymer particles for forming the moisture-retaining layer 20 may be any solvent as long as the raw material is homogeneously dissolved and the reaction product does not precipitate. For example, water can be used. Other examples of the solvent include monohydric alcohols such as methanol, ethanol, 1-propanol, 2-propanol, 1-butanol, 2-butanol, 2-methylpropanol, 1-pentanol, 2-pentanol, cyclopentanol, 2-methylbutanol, 3-methylbutanol, 1-hexanol, 2-hexanol, 3-hexanol, 4-methyl-2-pentanol, 2-methyl-1-pentanol, 2-ethylbutanol, 2,4-dimethyl-3-pentanol, 3-ethylbutanol, 1-heptanol, 2-heptanol, 1-octanol, and 2-octanol, and dihydric or higher alcohols such as ethylene glycol and triethylene glycol. Other examples of the solvent include ether alcohols such as methoxyethanol, ethoxyethanol, propoxyethanol, isopropoxyethanol, butoxyethanol, 1-methoxy-2-propanol, 1-ethoxy-2-propanol, and 1-propoxy-2-propanol; ethers such as dimethoxyethane, diglyme, tetrahydrofuran, dioxane, diisopropyl ether, dibutyl ether, and cyclopentyl methyl ether; esters such as ethyl formate, ethyl acetate, n-butyl acetate, ethylene glycol monomethyl ether acetate, ethylene glycol monoethyl ether acetate, ethylene glycol monobutyl ether acetate, and propylene glycol monomethyl ether acetate; and ketones such as acetone, methyl ethyl ketone, methyl isobutyl ketone, cyclopentanone, and cyclohexanone. Moreover, aprotic polar solvents such as N-methylpyrrolidone, N,N-dimethylformamide, N,N-dimethylacetamide, and ethylene carbonate can also be used. Two or more solvents may be selected from those described above, and mixed for use.

Additives can be added in order to improve the wettability of the liquid for forming the moisture-retaining layer 20 to the substrate, to increase the film thickness evenness, and to improve adhesion of the moisture-retaining layer 20 to the substrate or the like. Examples of the additives include a surfactant, a leveling agent, an adhesion promoter, and an acid catalyst, and the amount of the additives may be 2 parts by weight or less relative to the components necessary for forming the moisture-retaining layer 20.

Examples of the method for forming the moisture-retaining layer 20 by using a metal oxide precursor of a dispersion liquid containing metal oxide particles include a spin coating method, a spraying method, a blade coating method, a roll coating method, a slit coating method, a printing method, and a dip coating method. When an optical member having a three dimensionally complicated shape, such as a recessed surface, is to be manufactured, a spray coating method or a spraying method can be used from the viewpoint of evenness of the film thickness.

After the liquid for forming the moisture-retaining layer 20 is supplied onto the substrate 10, drying and/or curing is performed. Drying and curing are performed to remove the solvent or accelerate the reaction of the binder itself or the reaction between the binder and the particles. The drying and/or curing temperature is preferably 15° C. or more and 200° C. or less and more preferably 60° C. or more and 150° C. or less. When the drying and curing temperatures are less than 15° C., the solvent may remain and the wear resistance may be degraded. Moreover, when the drying and/or curing temperature exceeds 200° C., the binder is excessively cured and may undergo cracking. The drying and/or curing time is preferably 5 minutes or more and 24 hours or less and more preferably 15 minutes or more and 5 hours or less. When the drying and curing time is less than 5 minutes, the solvent partially remains, and fogging may occur in some part. When the drying and curing time exceeds 24 hours, the film may become susceptible to cracking.

The liquid in which silicon oxide particles are dispersed is suitable for forming the moisture-retaining layer 20 since the dispersion liquid can be easily manufactured and the stability of the liquid is relatively high. In the description below, the case in which the moisture-retaining layer 20 is formed by using a liquid in which silicon oxide particles are dispersed is described in detail.

The liquid in which silicon oxide particles are dispersed and which is used for forming the moisture-retaining layer 20 can be prepared by a method that involves diluting, with water or a solvent, a dispersion liquid containing spherical or chain-like silicon dioxide particles prepared by a wet method, such as a hydrothermal synthesis method. Alternatively, the dispersion liquid can be prepared by, for example, a method that involves substituting the solvent of the dispersion of silicon oxide particles prepared by the wet method with a desired solvent by distillation or ultrafiltration, or by a method that involves dispersing silicon oxide particles, such as fumed silica, synthesized by a dry method into water or a solvent using ultrasonic waves, a bead mill, or the like. When chain-like silicon oxide particles are used, particles having a shape other than the chain shape, such as spherical, elliptical, disk-like, rod-like, needle-like, or prismatic particles, can be appropriately mixed with the chain-like silicon oxide particles, and used as a mixture. The ratio at which the particles having a shape other than the chain-like shape can be mixed relative to all particles 21 can be appropriately determined by considering the refractive indices of the substrate and the films to be stacked.

The binder added to bond the silicon oxide particles to one another can be a silicon oxide compound. Examples of the silicon oxide compound include silicon oxide oligomers obtained by hydrolysis and condensation of silicate esters.

The amount of the silicon oxide compound added can be 1 mass % or more and 30 mass % or less relative to the silicon oxide particles. As long as the amount of the silicon oxide compound is 1 mass % or more, the strength needed for the film is obtained. As long as the amount is 30 mass % or less, pores 22 enough for the optical member to exhibit antifogging properties can be formed in the film. The amount of the silicon oxide compound can be 4 mass % or more and 20 mass % or less.

Examples of the method for adding a silicon oxide oligomer solution include a method that involves mixing a silicon oxide oligomer prepared in water or a solvent in advance with a dispersion liquid of silicon oxide particles, and a method that involves first mixing a raw material for the silicon oxide oligomer with a dispersion liquid of silicon oxide particles and then converting the raw material into the silicon oxide oligomer. The silicon oxide oligomer is prepared by adding water, an acid, or a base to a silicate ester, such as methyl silicate or ethyl silicate, in a solvent or a dispersion liquid so as to induce hydrolysis and condensation. Examples of the acid added to the silicate ester include hydrochloric acid, nitric acid, methanesulfonic acid, trifluoroacetic acid, trifluoromethanesulfonic acid, phosphoric acid, and p-toluenesulfonic acid. The base may be selected from among ammonia and various amines by considering the solubility in the solvent and the reactivity of the silicate ester. When preparing the binder solution, it is possible to perform heating at 80° C. or lower.

The weight average molecular weight of the silicon oxide condensate contained in the binder solution may be 500 or more and 3000 or less on a polystyrene basis. When the weight average molecular weight is less than 500, cracks easily occur after curing and the stability as a coating liquid may be degraded. When the weight average molecular weight exceeds 3000, the viscosity of the binder solution is increased, and large voids tend to occur.

When the silicon oxide particles are chemically bonded to one another, a method that involves bonding the silicon oxide particles via silanol groups with increased activity can be employed. Specific examples of such a method include a method that involves treating surfaces of the silicon oxide particles with a strong acid and a method that involves attaching silanol groups onto surfaces of the silicon oxide particles.

The solvent that can be used in the dispersion liquid of the silicon oxide particles may be any solvent that homogeneously dissolves the raw material and that causes no precipitation of the reaction product. The aforementioned monohydric alcohols, dihydric alcohols, ether alcohols, ethers, esters, ketones, and aprotic polar solvents and the like can be used. Furthermore, various aliphatic and alicyclic hydrocarbons such as n-hexane, n-octane, cyclohexane, cyclopentane, and cyclooctane, various aromatic hydrocarbons such as toluene, xylene and ethylbenzene, and various chlorinated hydrocarbons such as chloroform, methylene chloride, carbon tetrachloride, and tetrachloroethane can also be used. Two or more solvents may be selected from those described above, and mixed for use.

The high-refractive-index layer 33 included in the antireflection layer 30 illustrated in FIG. 3 is formed so that the ratio $R_0/R$ of the etching rate $R_0$ in the theoretical density state to the etching rate R is 0.75 or more and 0.90 or less. Alternatively, the high-refractive-index layer 33 is formed so that the refractive index ratio $n/n_0$ of the refractive index n to the refractive index $n_0$ of the compound constituting the layer at a theoretical density is 0.85 or more and 0.95 or less.

The high-refractive-index layer 33 can be formed to have a desired density by appropriately adjusting the deposition conditions during film formation by a vapor deposition method using, as the raw material, pellets of the compound constituting the layer. Specifically, unheated deposition that does not involve heating the substrate, a film forming method with controlled gas (such as oxygen) introduction pressure and substrate temperature, or oblique deposition that involves forming a film while placing a substrate to be oblique with respect to the direction in which the vapor deposition particles travel may be performed.

Although the reason is not clear, it has been confirmed that permeation of moisture is not obstructed even when the low-refractive-index layer 31 and the intermediate-refractive-index layer 32 are formed by a typical heated deposition method using the aforementioned silicon oxide, aluminum oxide, calcium fluoride, or the like as long as the layer thickness is 10 nm or more and 200 nm or less. The low-refractive-index layer 31 can be a magnesium fluoride layer that exhibits a particularly low refractive index compared to other materials.

Second Embodiment

When the high-refractive-index layers 33 are to be formed by unheated deposition or oblique deposition, it is effective to continuously form other layers by the same deposition method in view of the takt time and the production cost. When the low-refractive-index layer (magnesium fluoride layer) 31 is formed under the same conditions as those for the high-refractive-index layers 33, the density of the low-refractive-index layer 31 is also decreased. Since the low-refractive-index layer 31 is formed on the uppermost surface of the optical member 100 most prone to damage upon application of external force, there is a risk that the scratch resistance of the optical member 100 would be degraded by the low density of the low-refractive-index layer 31.

In this embodiment, a structure of an optical member that exhibits excellent antireflection properties and antifogging properties as well as excellent scratch resistance by increasing the strength of the magnesium fluoride layer 31 formed as the uppermost surface of the optical member 100 is described. In the description below, the differences from the first embodiment are mainly described, and similar features may be omitted from the description.

Figure 4:
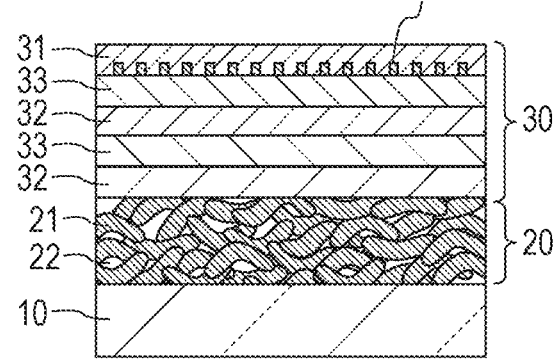
FIG. 4 is a schematic view of an optical member that includes a low-refractive-index layer having columnar structures according to one embodiment of the optical member of the present disclosure.

FIG. 4 is a schematic cross-sectional view of an optical member 100 according to this embodiment. The optical member 100 of this embodiment includes a magnesium fluoride layer 31 that has multiple columnar structures 34 at the interface with the adjacent layer on the substrate 10 side of the magnesium fluoride layer 31. The columnar structures 34 are regions having higher densities than other portions of the magnesium fluoride layer.

The height of the columnar structures 34 relative to the film thickness of the magnesium fluoride layer 31 can be 27% or more and 40% or less. When the height of the columnar structures 34 is within this range, a film having a strength, less scattering, and excellent transparency can be obtained.

The strength of the magnesium fluoride layer 31 decreases as the average pitch of the columnar structures 34 increases. Thus, in order to obtain the film strength required for the uppermost surface layer of the optical member, the average pitch of the columnar structures 34 can be 60 nm or less.

Figure 5:
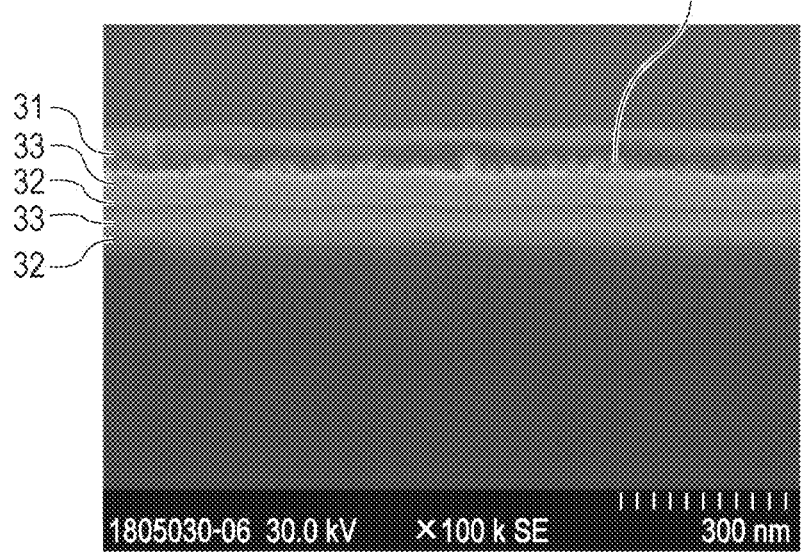
FIG. 5 is SEM image of a cross section of an optical member according to a third embodiment of the present disclosure.

The height and the average pitch of the columnar structures 34 can be measured by observing a cross section of the magnesium fluoride layer 31 in a secondary electron microscope image and image-processing the image. FIG. 5 is SEM image of a cross section of the optical member 100 of this embodiment having the same structure as that illustrated in FIG. 3. The columnar structures 34 are observed as portions with higher luminosity than other portions in the SEM image, and this indicates that the columnar structures 34 have lower electrical resistivities and higher densities than other portions. In order to image-process this SEM image, a commercially available image processing software such as Image-Pro PLUS (produced by Media Cybernetics, Inc.) can be used.

From experiments, it has been found that the pitch and the height of the columnar structures 34 can be controlled through the surface roughness of the surface on which the magnesium fluoride layer 31 is formed, and the film deposition conditions. The antireflection layer is formed to follow the surface profile of the moisture-retaining layer; thus, the profile of the surface on which the magnesium fluoride layer 31 is to be formed can be controlled through the surface profile of the moisture-retaining layer 20.

The surface profile of the moisture-retaining layer 20 can be such that the surface roughness (arithmetic mean roughness) is 12 nm or more and 15 nm or less. When the surface roughness is 12 nm or more and 15 nm or less, it becomes easier for the columnar structures 34 to grow at desired pitches in the magnesium fluoride layer 31, and the strength of the film is improved. In order to further facilitate growth of the columnar structures 34 of the desired shape, the maximum level difference in the surface of the moisture-retaining layer 20 can be 14 nm or more and 18 nm or less.

The surface roughness and the maximum level difference of the moisture-retaining layer 20 can be measured by image-processing an observed transmission electron micrographic image of the interface between the moisture-retaining layer 20 and the layer disposed thereon. A commercially available image processing software such as Image-Pro PLUS (produced by Media Cybernetics, Inc.) can be used to process the image.

The surface roughness of the moisture-retaining layer 20 can be controlled through the film forming method. When the moisture-retaining layer 20 is to be a porous layer containing particles, the shape of the particles and the type of the solvent for the coating solution are appropriately selected to control the surface roughness and the maximum level difference to be within the desired ranges.

Third Embodiment

Depending of the design of the optical apparatus in which the optical member is used, the surface of the antireflection layer 30 is exposed to air, organic matters such as siloxane substances attach to the surface of the film, and the water contact angle increases in some cases. When the water contact angle of the surface of the antireflection layer 30 is increased, the presence of moisture in an amount exceeding the amount that can be retained by the optical member causes water droplets to form on the surface of the optical member and causes fogging.

Figure 6:
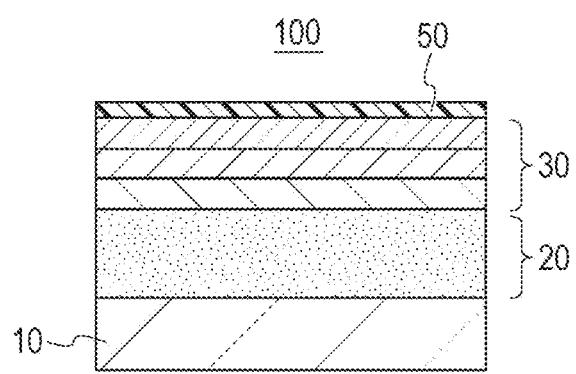
FIG. 6 is a schematic view of an optical member having a hydrophilic polymer layer according to one embodiment of the optical member of the present disclosure.

Thus, in this embodiment, as illustrated in FIG. 6, a hydrophilic polymer layer 50 is formed on the surface of the antireflection layer 30 to suppress the increase in the water contact angle of the surface of the optical member.

Hydrophilic Polymer Layer

Any compound that has a hydrophilic functional group can be used in the hydrophilic polymer layer 50; for example, a polymer having a zwitterionic hydrophilic group can be used. The presence of the zwitterionic hydrophilic group increases the hydrophilicity of the surface and decreases the electrical resistance; thus, electrostatic attachment of contaminants is inhibited. As a result, high hydrophilicity can be maintained over a long term. The presence of the hydrophilic polymer layer on the surface of the optical member can suppress fogging since the moisture that could not be retained in the optical member forms a water film rather than water droplets on the surface of the optical member.

Examples of the zwitterionic hydrophilic group include a sulfobetaine group, a carbobetaine group, a phosphorylcholine group, a sulfone group, a phosphonate group, and a carboxylic anhydride. The organic skeleton of the polymer having the zwitterionic hydrophilic group is not particularly limited.

In order to increase the adhesion between the hydrophilic polymer layer 50 and the antireflection layer 30, the chemical composition of the antireflection layer 30 in contact with the hydrophilic polymer layer 50 can be selected. For example, in order to cause the reaction with silanol groups in a silane coupling agent contained in a solution for forming the hydrophilic polymer layer 50, silicon oxide can be used in the surface of the antireflection layer 30 where the hydrophilic layer is to be formed.

In general, in order to enhance the antireflection properties of the antireflection layer formed of multiple layers, the refractive index of the layer in contact with air can be decreased. However, the compound used to form the hydrophilic polymer layer 50 is typically a silane coupling agent or a hydrophilic polymer, many of which have a refractive index exceeding 1.4. Thus, in order to suppress attachment of the siloxane organic matters to the surface and maintain the hydrophilicity without adversely affecting the antireflection properties of the antireflection layer 30, the thickness of the hydrophilic polymer layer 50 can be 1 nm or more and 20 nm or less.

As long as the thickness of the hydrophilic polymer layer is about this value, it is possible to design the refractive indices and thicknesses of the respective layers in the antireflection layer so that high antireflection properties are achieved despite formation of a hydrophilic layer.

The thickness of the hydrophilic polymer layer can be measured by the following procedure by using an X-ray photoelectron spectroscope.

An X-ray beam is applied to a surface of the optical device, and the element concentration derived from the hydrophilic polymer is measured from the intensity of the detected photoelectron peak. The element derived from the hydrophilic polymer that is used for measurement is sulfur when the hydrophilic group in the hydrophilic polymer is a sulfobetaine group, is phosphorus when the hydrophilic group is a phosphorylcholine group, and is nitrogen when the hydrophilic group is a carbobetaine group. Next, a desired particular region in the surface of the optical device is etched with an ion beam for a particular length of time, and then an X-ray beam is applied within the etched region to measure the element concentration derived from the hydrophilic polymer. A cycle of measurement of the element concentration derived from the hydrophilic polymer and etching is repeated multiple times to physically measure the depth D of the groove from the surface. The thickness of the hydrophilic polymer layer 50 etched by one etching step can be calculated from the number of times etching is performed and the depth D of the groove.

Under the etching conditions used for calculating the thickness of the layer etched by one etching step, etching and measurement of element concentration derived from the hydrophilic polymer are repeatedly performed on the hydrophilic polymer layer 50 on the surface of the optical device until the element derived from the hydrophilic polymer can no longer be detected. The product of the number of times etching is performed until the detection intensity of the element derived from the hydrophilic polymer disappears and the thickness of the layer etched in one etching step is assumed to be the thickness of the hydrophilic polymer layer 50 in the present disclosure.

The hydrophilic polymer layer 50 can be formed by supplying a solution containing a compound having a zwitterionic hydrophilic functional group onto the antireflection layer by a known wet method, and curing the supplied solution. Examples of the wet method include a spin coating method, a blade coating method, a roll coating method, a slit coating method, a printing method, and a dip coating method.

The compound having a hydrophilic functional group can be a polymer having a zwitterionic hydrophilic group. The main chain structure of the hydrophilic polymer can be an acrylic resin, a methacrylic resin, a polyurethane resin, a polyimide resin, a polyamide resin, an epoxy resin, a polystyrene resin, a polyester resin, or the like.

The solvent for the solution of the hydrophilic polymer can be a solvent having high compatibility with the hydrophilic polymer used, and can be selected from the following: alcohols such as methyl alcohol, ethyl alcohol, isopropyl alcohol, ethylene glycol and propylene glycol; ketones such as acetone and methyl ethyl ketone; ethers such as diethyl ether and tetrahydrofuran; aromatic hydrocarbon compounds such as benzene, toluene, and xylene; aliphatic hydrocarbon compounds such as n-hexane; alicyclic hydrocarbon compounds such as cyclohexane; and acetic acid esters such as methyl acetate and ethyl acetate.

Fourth Embodiment

Figure 13:
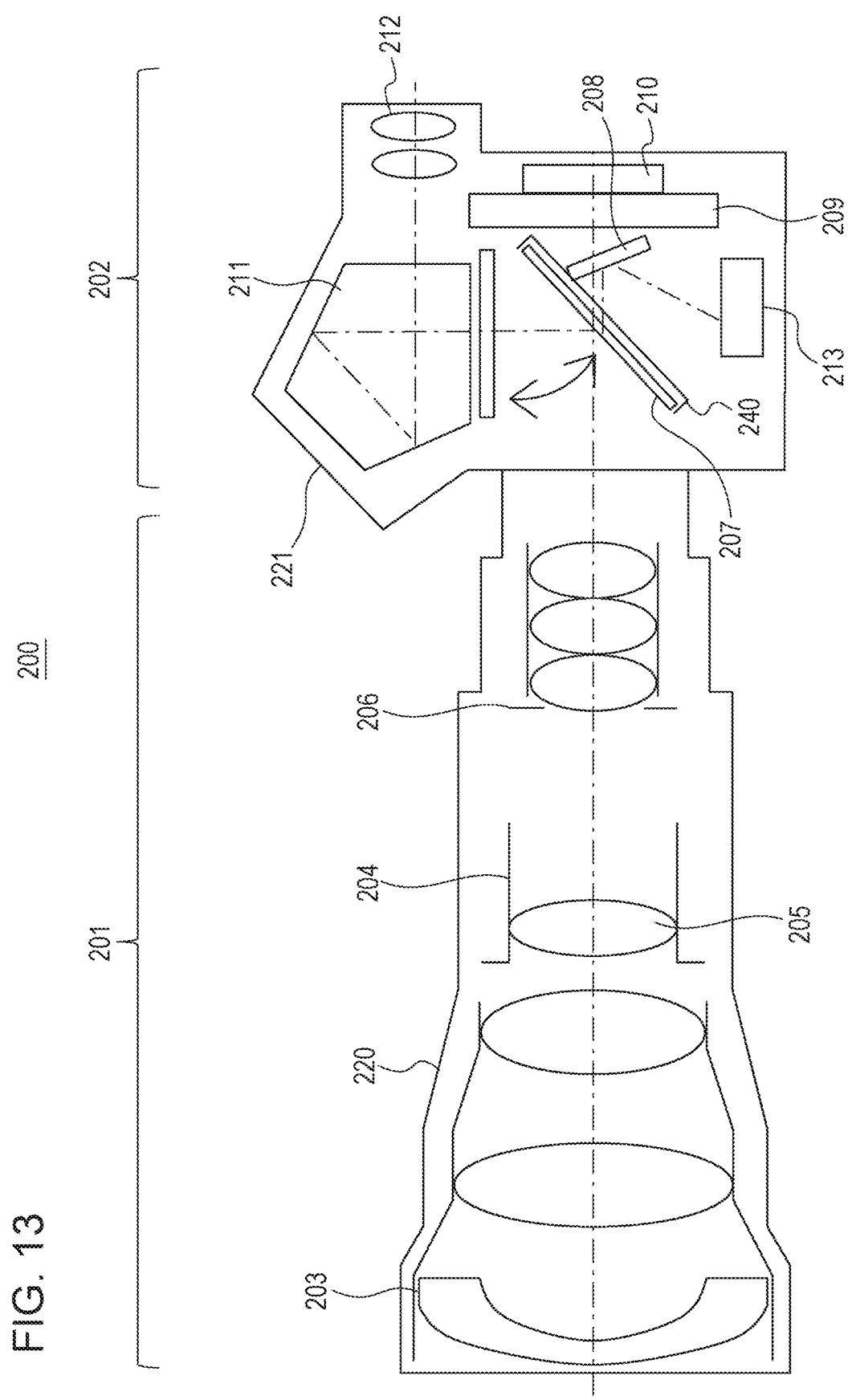
FIG. 13 is a diagram illustrating one example of an embodiment of an imaging apparatus according to the present disclosure.

FIG. 13 is illustrates an example of an embodiment of an imaging apparatus of the present disclosure, and illustrates a structure of a single-lens reflex digital camera combined with a lens barrel (interchangeable lens), which is one example of the optical apparatus of the present disclosure.

The optical apparatus of the present disclosure is an apparatus equipped with an optical system that includes the optical member of the present disclosure, and examples thereof include binoculars, microscopes, semiconductor exposure apparatuses, and interchangeable lenses. Alternatively, the optical apparatus is an apparatus that generates an image with light that has passed through the optical member of the present disclosure.

An imaging apparatus of the present disclosure is electronic equipment equipped with an imaging device that receives light that has passed through the optical element of the present disclosure, and examples thereof include camera systems such as digital still cameras and digital camcorders, and mobile phones. The imaging apparatus may be a module to be loaded into electronic equipment, and may be, for example, a camera module.

In FIG. 13, a camera body 202 and a lens barrel 201, which is an optical apparatus, are combined; however, the lens barrel 201 is an interchangeable lens that is detachably attached to the camera body 202.

Light from a photographic subject passes through the optical system constituted by lenses 203 and 205, etc., arranged on the optical axis of the imaging optical system in a casing 220 of the lens barrel 201, and is received by the imaging device. The optical member of the present disclosure can be used as the lens 203 that is most prone to fogging inside the casing, or can be used as any optical member constituting various optical systems, such as a finder lens 212, mirrors 207 and 208, and a cover glass of the imaging device 210. Here, the lens 205 is supported by an inner barrel 204 so as to be movable relative to an outer barrel of the lens barrel 201 for focusing or zooming.

During the observation period before imaging, light from the photographic subject is reflected by a main mirror 207 in the casing 221 of the camera body, passes through a prism 211, and passes through a finder lens 212 to present a captured image to the user. The main mirror 207 is, for example, a half mirror, and the light that has passed through the main mirror is reflected in a direction of an autofocus (AF) unit 213 by a sub mirror 208. For example, this reflected light is used for focusing. The main mirror 207 is mounted onto and supported by a main mirror holder 240 by bonding or the like. During imaging, the main mirror 207 and the sub mirror 208 are moved out of the optical path by a driving mechanism not illustrated in the drawing, a shutter 209 is opened, and the captured light image incident from the lens barrel 201 is focused on the imaging device 210. Moreover, a diaphragm 206 is configured so that the brightness and focal depth during imaging can be changed by changing the aperture area.

As illustrated in FIG. 13, when the optical system of the imaging apparatus is constituted by using the optical member of the present disclosure, the optical system can be prevented from fogging caused by the changes in the external environment, and excellent images can be obtained.

EXAMPLES

The present disclosure will now be described in detail through the examples below. The present disclosure is not limited by the following examples without departing from the gist thereof.

(1) Preparation of Particle Dispersion Liquid for Forming Moisture-Retaining Layer (1-1) Preparation of Silicon Oxide Particle Dispersion Liquid 1

To 500 g of a 2-propanol (IPA) dispersion liquid of chain-like silicon oxide particles (IPA-ST-UP produced by Nissan Chemical Corporation, average particle size: 12 nm, solid component concentration: 15 mass %), 1-propoxy-2-propanol was added while distilling away IPA so as to prepare 433.3 g of a 1-propoxy-2-propanol dispersion liquid of chain-like silicon oxide particles having a solid component concentration of 17.3 mass %.

In a separate vessel, 54 g of 0.01 mol/l diluted hydrochloric acid was slowly added to a solution containing 62.6 g of ethyl silicate and 36.8 g of 1-propoxy-2-propanol, and the resulting mixture was stirred at room temperature for 90 minutes. Subsequently, the mixture was heated at 40° C. for one hour, and a silicon oxide oligomer solution having a solid component concentration of 11.8 mass % was obtained as a result.

To the aforementioned 1-propoxy-2-propanol dispersion liquid of the chain-like silicon oxide particles, 25.4 g of the aforementioned silicon oxide oligomer solution was slowly added, and the resulting mixture was stirred for two hours at room temperature to prepare a silicon oxide particle dispersion liquid 1.

The dispersion liquid was subjected to particle size distribution analysis (ZETASIZER NANO ZS produced by Malvern Panalytical Ltd.) by a dynamic light scattering method, and it was confirmed that chain-like silicon oxide particles having a short axis of 11 nm and a long axis of 77 nm were dispersed.

(1-2) Preparation of Silicon Oxide Particle Dispersion Liquid 2

To 500 g of an aqueous dispersion liquid of chain-like silicon oxide particles (PL-1 produced by FUSO CHEMICAL CO., LTD., average particle size: 15 nm, solid component concentration: 12 mass %), 1-propoxy-2-propanol was added while distilling away water so as to prepare 433.3 g of a 1-propoxy-2-propanol dispersion liquid of chain-like silicon oxide particles having a solid component concentration of 17.3 mass %.

In a separate vessel, 54 g of 0.01 mol/l diluted hydrochloric acid was slowly added to a solution containing 62.6 g of ethyl silicate and 36.8 g of 1-propoxy-2-propanol, and the resulting mixture was stirred at room temperature for 90 minutes. Subsequently, the mixture was heated at 40° C. for one hour, and a silicon oxide oligomer solution having a solid component concentration of 11.8 mass % was obtained as a result.

To the aforementioned 1-propoxy-2-propanol dispersion liquid of the chain-like silicon oxide particles, 20.3 g of the aforementioned silicon oxide oligomer solution was slowly added, and the resulting mixture was stirred for two hours at room temperature to prepare a chain-like silicon oxide particle dispersion liquid 2.

(1-3) Preparation of Silicon Oxide Particle Dispersion Liquid 3

To 200 g of a methanol dispersion liquid of spherical silicon oxide particles (MA-ST-M produced by Nissan Chemical Corporation, average particle size: 22 nm, solid component concentration: 40 mass %), 1-methoxy-2-propanol was added while distilling away methanol so as to prepare 462.2 g of a 1-methoxy-2-propanol dispersion liquid of spherical silicon oxide particles having a solid component concentration of 17.3 wt %.

In a separate vessel, 54 g of 0.01 mol/l diluted hydrochloric acid was slowly added to a solution containing 62.6 g of ethyl silicate and 36.8 g of 1-methoxy-2-propanol, and the resulting mixture was stirred at room temperature for 90 minutes. Subsequently, the mixture was heated at 40° C. for one hour, and a silicon oxide oligomer solution having a solid component concentration of 11.8 mass % was obtained as a result.

To the aforementioned 1-methoxy-2-propanol dispersion liquid of the spherical silicon oxide particles, 27.1 g of the aforementioned silicon oxide oligomer solution was slowly added, and the resulting mixture was stirred for two hours at room temperature to prepare a spherical silicon oxide particle dispersion liquid 3.

(1-4) Preparation of Silicon Oxide Particle Dispersion Liquid 4

A chain-like silicon oxide particle dispersion liquid 4 was prepared as with the silicon oxide particle dispersion liquid 2 except that 2-heptanone was used instead of 1-propoxy-2-propanol.

(1-5) Preparation of Silicon Oxide Particle Dispersion Liquid 5

To 200 g of a 2-propanol (IPA) dispersion liquid of spherical silicon oxide particles (IPA-ST-UP produced by Nissan Chemical Corporation, average particle size: 45 nm, solid component concentration: 40 wt %), 1-propoxy-2-propanol was added while distilling away IPA so as to prepare 462.2 g of a 1-propoxy-2-propanol dispersion liquid of spherical silicon oxide particles having a solid component concentration of 17.3 wt %.

In a separate vessel, 54 g of 0.01 mol/l diluted hydrochloric acid was slowly added to a solution containing 62.6 g of ethyl silicate and 36.8 g of 1-propoxy-2-propanol, and the resulting mixture was stirred at room temperature for 90 minutes. Subsequently, the mixture was heated at 40° C. for one hour, and a silicon oxide oligomer solution having a solid component concentration of 11.8 wt % was obtained as a result.

To the aforementioned 1-propoxy-2-propanol dispersion liquid of the spherical silicon oxide particles, 27.1 g of the aforementioned silicon oxide oligomer solution was slowly added, and the resulting mixture was stirred for two hours at room temperature to prepare a spherical silicon oxide particle dispersion liquid 5.

(2) Preparation of Silicon Oxide Particle Dispersion Liquid 6 for Forming Undercoat Layer To 370 g of a 1-methoxy-2-propanol (hereinafter, PGME) dispersion liquid of spherical silicon oxide particles (PGM-ST produced by Nissan Chemical Corporation, average particle size: 12 nm, solid component concentration: 30 mass %), 1-ethoxy-2-propanol was added to prepare 2018.2 g of a 1-ethoxy-2-propanol dispersion liquid of spherical silicon oxide particles having a solid component concentration of 5.5 mass %.

In a separate vessel, 54 g of 0.01 mol/l diluted hydrochloric acid was slowly added to a solution containing 62.6 g of ethyl silicate and 36.8 g of 1-ethoxy-2-propanol, and the resulting mixture was stirred at room temperature for 90 minutes and then heated at 40° C. for one hour. As a result, a silicon oxide oligomer solution having a solid component concentration of 11.8 mass % was obtained.

To the aforementioned 1-ethoxy-2-propanol dispersion liquid of the spherical silicon oxide particles, 94.1 g of the aforementioned silicon oxide oligomer solution was slowly added, and the resulting mixture was stirred for two hours at room temperature to prepare a silicon oxide particle dispersion liquid 6.

The dispersion liquid was subjected to particle size distribution analysis (ZETASIZER NANO ZS produced by Malvern Panalytical Ltd.) by a dynamic light scattering method, and it was confirmed that spherical silicon oxide particles a particle size of 15 nm were dispersed.

(3) Measurement of Film Thickness

After a carbon film and a Pt—Pd film were coated on an antireflection layer formed on a substrate, a thin slice was prepared in an electron beam machining apparatus (FIB-SEM, Nova 600 produced by FEI) and was observed with a scanning transmission electron microscope (STEM, S-5500 produced by Hitachi Corporation).

(4) Measurement of Refractive Index

The refractive index was measured with a spectroscopic ellipsometer from a wavelength of 380 nm to 800 nm. As the representative value of the refractive index, nd is indicated. The film thickness measured in (3) was used in measuring the refractive index. The theoretical refractive index was determined by measuring the refractive index of a film by a spectroscopic ellipsometer, the film being formed by deposition on a quartz substrate and by using pellets having substantially the same composition as the compound constituting the layer under the conditions of a substrate heating temperature of 250° C., a degree of vacuum during deposition of $1\times10^{-2}$ Pa, and a deposition rate of 4 Å/sec. The compound constituting the layer was identified by the following procedure. An Ar ion beam was applied to a 2 mm×2 mm square region of an antireflection layer by using an FIB-SEM machining apparatus (Quanta 200 produced by FEI) at an acceleration voltage of 1000 V, and 30 seconds of etching was repeatedly performed. Every 30 seconds of etching, the XPS elemental analysis was performed by selecting the detection element according to the composition of the layer to be etched, and the compound contained in each layer was identified.

(5) Measurement of Etching Rate

From among the layers included in the antireflection layer, the layer having the highest refractive index was analyzed to determine the etching rate R. An Ar ion beam was applied to a 2 mm×2 mm square region by using an FIB-SEM machining apparatus (Quanta 200 produced by FEI) at an acceleration voltage of 1000 V, and 30 seconds of etching was repeatedly performed. Every 30 seconds of etching, the XPS elemental analysis was performed by selecting the detection element according to the composition of the layer to be etched, and the timing that a new layer appeared was detected. The pass energy was set to 55.0 eV and the step was set to 0.050 eV. In the theoretical density state of the composition of the layer for which the etching rate was measured, the etching rate $R_0$ under the same etching conditions was measured, and $R_0/R$ was calculated.

(6) Evaluation of Antifogging Properties

By using an antifogging property evaluation apparatus (AFA-2 produced by Kyowa Interface Science, Inc.), a transparent substrate retained at 25° C. was cooled to 15° C. while being left in an atmosphere of 25° C. and 70% RH, and a transmitted image was recorded every second for up to 300 seconds. Compressive antifogging index analysis was performed on the transmitted images, and the compressive antifogging index was plotted versus time.

The time taken before the compressive antifogging index started to decrease from the initial value was read off from the obtained plot, and the antifogging properties were evaluated by the following standard. The longer the time taken before the compressive antifogging index started to decrease from the initial value, the better the antifogging properties.

A: 100 seconds or more
B: 80 seconds or more but less than 100 seconds
C: less than 80 seconds (7) Reflectance Evaluation By using a reflectance meter (USPM-RU produced by Olympus Corporation), the absolute reflectance was measured from the wavelength of 380 nm to 780 nm, the average reflectance from the wavelength of 400 to 700 nm was determined, and the evaluation was performed on the basis of the following standard. The smaller the average reflectance, the better the reflection properties.

A: The average reflectance was less than 0.5%.
B: The average reflectance was 0.5% or more but less than 1.0%.
C: The average reflectance was 1.0% or more.

(8) Comprehensive Evaluation

On the basis of the evaluation results of the antifogging properties (6) and the reflectance (7), the properties of each optical member were comprehensively evaluated. The evaluation standard was as follows. An optical member rated A in comprehensive evaluation is the most suitable as an antifogging optical member, and an optical member rated C in comprehensive evaluation is unsuitable as an antifogging optical member.

A: Rated A in both antifogging property and reflectance evaluation.
B: Rated A in the antifogging property evaluation but rated B or C in the reflectance evaluation.
C: Rated B or C in the antifogging property evaluation.

Examples 1 to 4

An appropriate amount of the silicon oxide particle dispersion liquid 2 was dropped onto a 40 mm-square flat glass substrate having a thickness of 3 mm (S-BSL7 produced by OHARA INC., nd=1.52), spin coating was performed at 4000 rpm for 30 seconds, and then the dispersion liquid was heated and cured in a circulating hot air oven at 140° C. for 30 minutes to form an undercoat layer. An appropriate amount of the silicon oxide particle dispersion liquid 1 was dropped onto the undercoat layer, spin coating was performed at 1500 rpm for 30 seconds, and then the dispersion liquid was heated and cured in a circulating hot air oven at 140° C. for 30 minutes to form a moisture-retaining layer. Next, an antireflection layer constituted by a combination of a layer containing silicon oxide, a layer containing zirconium oxide and titanium oxide, and a layer containing magnesium fluoride was formed on the basis of the design that considers the antireflection properties. During the film formation, the substrate temperature, the ultimate vacuum pressure, and the pressures during formation of individual layers were adjusted so that a desired refractive index was obtained.

For an antireflection layer, intermediate-refractive-index layers 32 and high-refractive-index layers 33 were alternately stacked from the substrate 10 side, and the low-refractive-index layer 31 was formed as the uppermost surface. The layers were formed by vapor deposition by rotating the substrate 10 without heating while heating the pellets of the compounds described below in crucibles. Although the substrate 10 is not heated, the temperature thereof may slightly rise due to the heat from the crucibles.

Intermediate-refractive-index layer 32: silicon oxide ($SiO_2$ E type produced by Canon Optron, Inc.)
High-refractive-index layer 33: a mixture of zirconium oxide and titanium oxide (OH-5 produced by Nichia Corporation)
Low-refractive-index layer 31: magnesium fluoride ($MgF_2$ produced by Kisan Kinzoku Chemicals Co., Ltd.)

The layer structures of the optical members of the respective examples are indicated in Table 1.

Comparative Example 1

A flat glass substrate similar to that used in Example 1 was directly used as Comparative Example 1.

Comparative Example 2

An optical member was obtained by depositing multiple layers having different refractive indices so that the layer structure indicated in Table 1 was formed on a flat glass substrate similar to that used in Example 1 but without forming the undercoat layer or the moisture-retaining layer.

Comparative Example 3

An undercoat layer and a moisture-retaining layer were formed as in Example 1 to obtain an optical member. The difference from Example 1 is that the antireflection layer was not formed.

Comparative Examples 4 and 5

Optical members were prepared as in Example 1 except that, in Comparative Example 4, the antireflection layer had the layer structure indicated in Table 1 and, in Comparative Example 5, the antireflection layer had a film structure 9 indicated in Table 1.

The layer structures and evaluation results of the examples and the comparative examples are summarized in Tables 1 and 2. The theoretical refractive index no used in calculating the refractive index ratio of each layer was as follows.

Silicon oxide: 1.46

Mixture of zirconium oxide and titanium oxide: 2.12

Magnesium fluoride: 1.38

TABLE 1

| | | Substrate | Undercoat layer | Moisture-retaining layer | Antireflection layer | | | | |
|---|---|---|---|---|---|---|---|---|---|
| | | | | | Layer 1 | Layer 2 | Layer 3 | Layer 4 | Layer 5 |
| Example 1 | Material | S-BSL7 | Silicon oxide | Silicon oxide | Silicon oxide | Zirconium oxide and titanium oxide | Silicon oxide | Zirconium oxide and titanium oxide | Magnesium fluoride |
| | Refractive index $n_d$ | 1.52 | 1.38 | 1.23 | 1.43 | 1.98 | 1.43 | 1.98 | 1.38 |
| | Film thickness [nm] | — | 96 | 1312 | 95 | 42 | 8 | 75 | 92 |
| Example 2 | Material | S-BSL7 | Silicon oxide | Silicon oxide | Silicon oxide | Zirconium oxide and titanium oxide | Silicon oxide | Zirconium oxide and titanium oxide | Magnesium fluoride |
| | Refractive index $n_d$ | 1.52 | 1.38 | 1.23 | 1.43 | 1.96 | 1.43 | 1.96 | 1.38 |
| | Film thickness [nm] | — | 96 | 1330 | 95 | 43 | 8 | 77 | 92 |
| Example 3 | Material | S-BSL7 | Silicon oxide | Silicon oxide | Silicon oxide | Zirconium oxide and titanium oxide | Silicon oxide | Zirconium oxide and titanium oxide | Magnesium fluoride |
| | Refractive index $n_d$ | 1.52 | 1.38 | 1.23 | 1.43 | 1.80 | 1.43 | 1.80 | 1.38 |
| | Film thickness [nm] | — | 94 | 1322 | 95 | 42 | 8 | 76 | 92 |
| Example 4 | Material | S-BSL7 | Silicon oxide | Silicon oxide | Silicon oxide | Zirconium oxide and titanium oxide | Magnesium fluoride | — | — |
| | Refractive index $n_d$ | 1.52 | 1.38 | 1.23 | 1.43 | 1.85 | 1.38 | — | — |
| | Film thickness [nm] | — | 98 | 1308 | 102 | 45 | 105 | — | — |
| Comparative Example 1 | Material | S-BSL7 | — | — | — | — | — | — | — |
| | Refractive index $n_d$ | 1.52 | — | — | — | — | — | — | — |
| | Film thickness [nm] | — | — | — | — | — | — | — | — |
| Comparative Example 2 | Material | S-BSL7 | — | — | Silicon oxide | Zirconium oxide and titanium oxide | Silicon oxide | Zirconium oxide and titanium oxide | Magnesium fluoride |
| | Refractive index $n_d$ | 1.52 | — | — | 1.43 | 1.96 | 1.43 | 1.96 | 1.38 |
| | Film thickness [nm] | — | — | — | 95 | 43 | 8 | 77 | 92 |

TABLE 1-continued

| | | Substrate | Undercoat layer | Moisture-retaining layer | Antireflection layer | | | | |
|---|---|---|---|---|---|---|---|---|---|
| | | | | | Layer 1 | Layer 2 | Layer 3 | Layer 4 | Layer 5 |
| Comparative Example 3 | Material | S-BSL7 | Silicon oxide | Silicon oxide | — | — | — | — | — |
| | Refractive index $n_d$ | 1.52 | 1.38 | 1.23 | — | — | — | — | — |
| | Film thickness [nm] | — | 94 | 1325 | — | — | — | — | — |
| Comparative Example 4 | Material | S-BSL7 | Silicon oxide | Silicon oxide | Silicon oxide | Zirconium oxide and titanium oxide | Silicon oxide | Zirconium oxide and titanium oxide | Magnesium fluoride |
| | Refractive index $n_d$ | 1.52 | 1.38 | 1.23 | 1.43 | 2.12 | 1.43 | 2.12 | 1.38 |
| | Film thickness [nm] | — | 94 | 1312 | 95 | 42 | 8 | 76 | 92 |
| Comparative Example 5 | Material | S-BSL7 | Silicon oxide | Silicon oxide | Silicon oxide | Zirconium oxide and titanium oxide | Silicon oxide | Zirconium oxide and titanium oxide | Magnesium fluoride |
| | Refractive index $n_d$ | 1.52 | 1.38 | 1.23 | 1.43 | 1.72 | 1.43 | 1.72 | 1.38 |
| | Film thickness [nm] | — | 95 | 1316 | 95 | 42 | 8 | 76 | 92 |

TABLE 2

| | Etching rate $[R_0/R]$ | Refractive index ratio $[n/n_0]$ | Antifogging property [sec] | Average reflectance [%] | Antifogging property evaluation | Reflectance evaluation | Comprehensive evaluation |
|---|---|---|---|---|---|---|---|
| Example 1 | 0.89 | 0.93 | 111 | 0.4 | A | A | A |
| Example 2 | 0.80 | 0.92 | 122 | 0.4 | A | A | A |
| Example 3 | 0.75 | 0.85 | 105 | 0.8 | A | B | B |
| Example 4 | 0.89 | 0.87 | 103 | 0.8 | A | B | B |
| Comparative Example 1 | — | — | 68 | 3.8 | C | C | C |
| Comparative Example 2 | 0.80 | 0.92 | 68 | 0.8 | C | B | C |
| Comparative Example 3 | — | — | 91 | 1.2 | B | C | C |
| Comparative Example 4 | 0.98 | 1.00 | 75 | 0.5 | C | B | C |
| Comparative Example 5 | 0.58 | 0.81 | 93 | 1.1 | B | C | C |

Evaluation of Examples 1 to 4 and Comparative Examples 1 to 5

Figure 7:
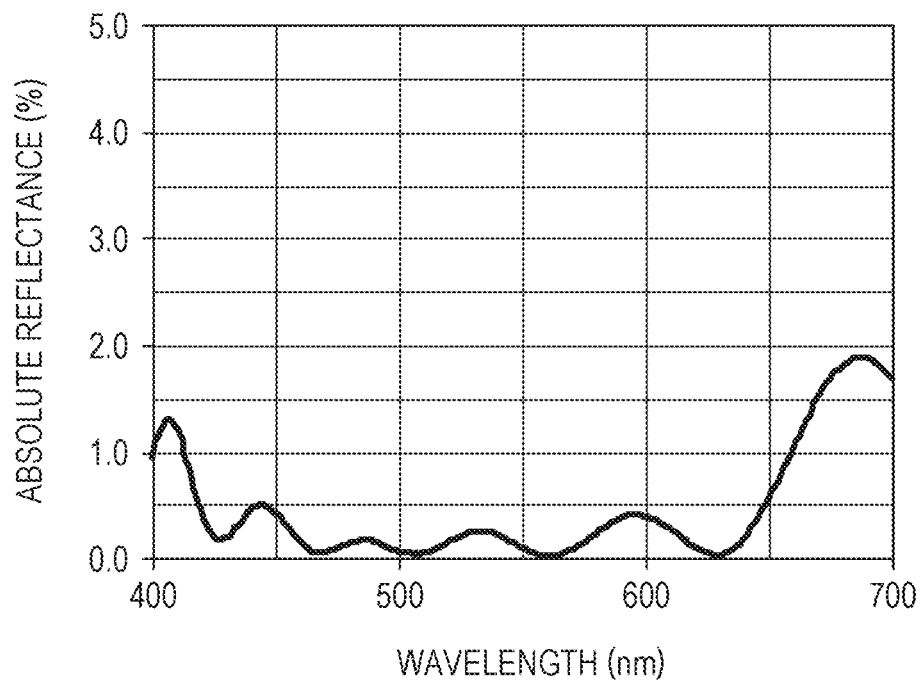
FIG. 7 is a graph indicating the reflectance property of an optical member of Example 1.
Figure 8:
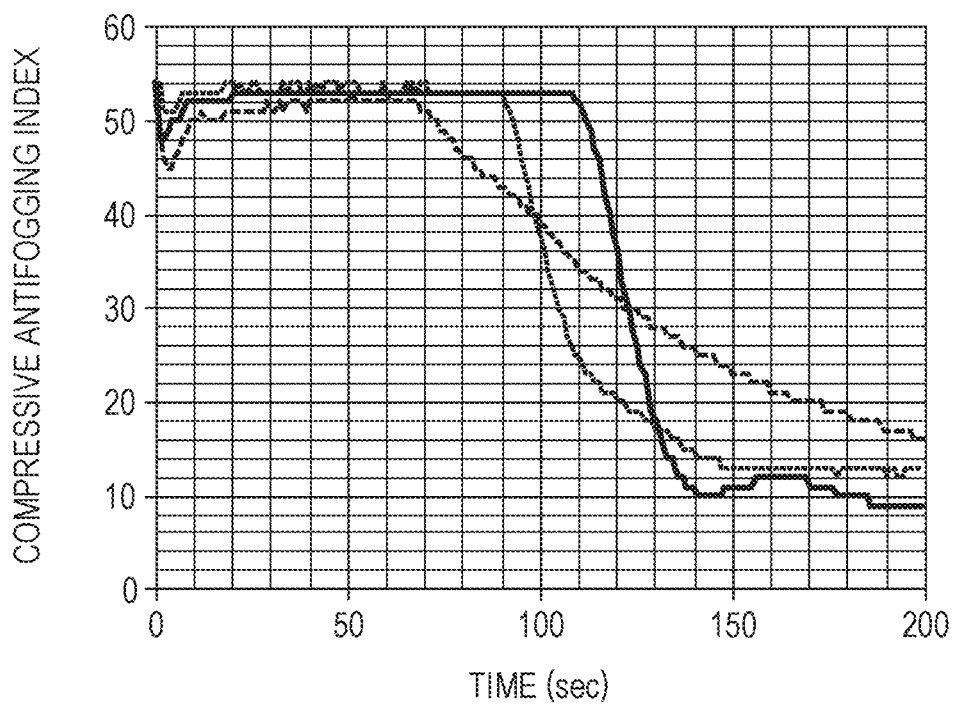
FIG. 8 is a graph indicating changes in compressive antifogging index versus the humidifying time of optical members of Example 1 and Comparative Examples 1 and 2.

An example of the measurement results is illustrated in FIG. 7, which indicates the reflection properties measured from the optical member of Example 1. The average reflectance was 0.4%, and this shows that the antireflection properties are excellent. In addition, the changes in compressive antifogging index versus the humidifying time for the optical members of Example 1 and Comparative Examples 1 and 2 are indicated in FIG. 8. This shows that the optical member of Example 1 did not fog before 111 seconds; however, the optical members of Comparative Examples 1 and 2 started to fog before 100 seconds. The evaluation results of the examples and the comparative examples are summarized in Table 2.

The optical member of Comparative Example 1 solely constituted by the glass substrate fogged in 68 seconds in the antifogging property evaluation. The optical member of Comparative Example 2 constituted by the glass substrate and an antireflection layer formed of a metal oxide film also fogged in 68 seconds in the antifogging property evaluation. These results show that an optical member that includes only an antireflection layer formed of a metal oxide film does not have improved antifogging properties.

The optical member of Comparative Example 3 in which only a porous film formed of silicon oxide was formed, the time taken before the start of fogging was extended to 91 seconds, and thus the antifogging properties were improved; however, the average reflectance was as high as 1.1%. In contrast, none of the optical members of Examples 1 to 5 started to fog in 100 seconds in the antifogging property evaluation, and are superior to comparative Example 3 in terms of antifogging properties. In addition, it was confirmed that the reflectance was also low.

As in Comparative Example 4, a high-refractive-index layer having a refractive index ratio $n/n_0$ of 1.00 is close to the theoretical refractive index of the compound constituting the high-refractive-index layer and is in a dense state; thus, the moisture on the surface of the optical member could not permeate and could not be retained in the moisture-retaining layer. The time taken before the surface of the optical member started to fog was thus shorter than in Comparative Example 3 in which only a porous layer formed of silicon oxide was formed. In contrast, antifogging properties were obtained in Comparative Example 5 in which the refractive index ratio $n/n_0$ was 0.81, but there were too many pores in the antireflection layer, thus a refractive index suitable for antireflection layer could not obtained, and the reflectance was high. Moreover, the film became sparse, and the film had weak portions.

The results in Examples 1 to 4 and Comparative Examples 1 to 5 showed that the antifogging properties and the antireflection properties were excellent and that properties suitable for optical members could be obtained when the ratio $n/n_0$ of the refractive index n of the high-refractive-index layer included in the antireflection layer to the theoretical refractive index $n_0$ of the high-refractive-index layer was 0.85 or more and 0.95 or less.

Examples 5 to 7 and Comparative Examples 6 to 8

In order to evaluate the optical member of the second embodiment, optical members of Examples 5 to 7 and Comparative Examples 6 to 8 indicated in Table 3 were prepared. The substrate used, and the methods for forming the moisture-retaining layer and the antireflection layer were the same as in Examples 1 to 4. In Table 3, the samples that included five layers in an antireflection layer had the same layer structure as Example 1, and the samples that included three layers in an antireflection layer had the same layer structure as Example 4.

The optical members obtained in Examples and Comparative Examples were evaluated by the following methods. The results are summarized in Table 3.

(10) Height and Average Pitch of Columnar Structures

After a carbon film and a Pt—Pd film were coated on the prepared optical member, a thin slice was prepared in an electron beam machining apparatus (FIB-SEM, Nova 600 produced by FEI). The prepared thin slice was observed with a scanning transmission electron microscope (STEM, S-5500 produced by Hitachi Corporation), and a secondary electron image was obtained therefrom. The thickness of each layer was measured from the obtained secondary electron image.

Hitachi Corporation) at a magnification of 100,000 such that the magnesium fluoride layer and the layer directly below it were included in the view.

The number of columnar structures that had a height of 27% or more of the thickness of the magnesium fluoride layer was counted from the obtained secondary electron image, and the average of the heights was assumed to be the height of the columnar structures. In addition, the number obtained by dividing the length of the boundary of the magnesium fluoride by the number of columnar structures having a height of 27% or more of the thickness of the magnesium fluoride layer was assumed to be the average pitch.

(11) Measurement of Surface Roughness and Maximum Level Difference of Moisture-Retaining Layer After a carbon film and a Pt—Pd film were coated on the prepared optical member, a thin slice was prepared in an electron beam machining apparatus (FIB-SEM, Nova 600 produced by FEI). A secondary electron image was obtained from the prepared thin slice by using a scanning transmission electron microscope (STEM, S-5500 produced by Hitachi Corporation) at a magnification of 100,000 such that the moisture-retaining layer and the layer directly above it were included in the view.

The arithmetic mean roughness Ra and the maximum level difference were calculated from the border between the moisture-retaining layer and the layer directly above it from the obtained secondary electron image. The arithmetic mean roughness Ra was assumed to be the surface roughness.

(12) Evaluation of Strength

The surface of the film was wiped with Silbon paper at a load of 204 g/cm$^2$ in ten reciprocal motions, the presence of scratches was checked by visual observation, and the evaluation was made on the basis of the following standard.
A: No scratches were found.
B: Scratches were found.

TABLE 3

| | Moisture-retaining layer | | | | | | Antireflection layer | | | | |
| --- | --- | --- | --- | --- | --- | --- | --- | --- | --- | --- | --- |
| | Particle dispersion liquid | Particle shape | Average particle size [nm] | Solvent | Surface roughness [nm] | Maximum level difference [nm] | Number of stacked layers | Columnar structure height [nm] | Columnar structure pitch [nm] | Strength | Antifogging property |
| Example 5 | Particle dispersion liquid 1 | Chain-like | 12 | 1-Propoxy-2-propanol | 15 | 18 | 5 | 36 | 49 | A | A |
| Example 6 | Particle dispersion liquid 2 | Chain-like | 15 | 1-Propoxy-2-propanol | 12 | 14 | 5 | 31 | 59 | A | A |
| Example 7 | Particle dispersion liquid 1 | Chain-like | 12 | 1-Propoxy-2-propanol | 15 | 18 | 3 | 38 | 51 | A | A |
| Comparative Example 6 | — | — | — | — | 1 | 1 | 5 | 28 | 141 | B | B |
| Comparative Example 7 | Particle dispersion liquid 3 | Spherical | 22 | 1-Methoxy-2-propanol | 11 | 14 | 5 | 30 | 67 | B | B |
| Comparative Example 8 | Particle dispersion liquid 4 | Chain-like | 15 | 2-heptanone | 10 | 10 | 5 | 33 | 70 | B | B |

After a carbon film and a Pt—Pd film were coated on the prepared optical member, a thin slice was prepared in an electron beam machining apparatus (FIB-SEM, Nova 600 produced by FEI). A secondary electron image was obtained from the prepared thin slice by using a scanning transmission electron microscope (STEM, S-5500 produced by Evaluation of Examples 5 to 7 and Comparative Examples 6 to 8

Comparison of the evaluation results of the optical members of Examples 5 to 7 and Comparative Examples 6 to 8 indicates that, when the columnar structure pitch is 60 nm or less, the force applied to each of the columnar structure is dispersed, and the strength of the film as a whole increases. It is also clear that the larger the surface roughness of the moisture-retaining layer, the more the columnar structures grow and the smaller the pitch. In the optical member of Comparative Example 1, the columnar structure pitch is large, and thus the force applied to each of the columnar structure is large, resulting in a decreased film strength.

Thus, it was shown that the optical members of Examples that satisfy the requirements of the present disclosure have strength superior to those of Comparative Examples. Although not indicated in the tables, Examples 5 to 7 were also subjected to the antifogging property evaluation (7), and all were rated A.

Example 8

As an example that corresponds to the third embodiment, an optical member having a hydrophilic polymer layer was prepared.

To 5 g of LAMBIC-771W (produced by OSAKA ORGANIC CHEMICAL INDUSTRY LTD), which is an aqueous solution of an acrylic polymer having a sulfobetaine group, 95 g of pure water was added to dilute, and the resulting mixture was stirred at room temperature for 10 minutes to prepare a hydrophilic polymer layer coating liquid.

An appropriate amount of the silicon oxide particle dispersion liquid 2 was dropped onto a 40 mm-square flat quarts substrate (nd=1.47) having a thickness of 3 mm, spin coating was performed at 4000 rpm for 30 seconds, and then the dispersion liquid was heated and cured in a circulating hot air oven at 140° C. for 30 minutes to form an undercoat layer. An appropriate amount of the silicon oxide particle dispersion liquid 1 was dropped onto the undercoat layer, spin coating was performed at 1500 rpm for 30 seconds, and then the dispersion liquid was heated and cured in a circulating hot air oven at 140° C. for 30 minutes to form a moisture-retaining layer. Subsequently, a silicon oxide film, a film formed of a mixture of zirconium oxide and titanium oxide, and a magnesium fluoride film were formed by the same method as in Example 1 so that the refractive index and the thicknesses that take reflectance properties into account were obtained (Table 5).

Then, an appropriate amount of the hydrophilic polymer coating liquid was dropped thereon, spin coating was performed at 3500 rpm for 30 seconds, an appropriate amount of water was dropped thereon, and spin coating was performed at 3500 rpm for 30 seconds.

Example 9

An optical member was prepared as in Example 8 except that an aqueous solution of a polymer having a sulfonic acid group was used.

Example 10

An optical member was prepared as in Example 8 except that an aqueous solution of a polymer having a structure formed of sodium phosphonate was used.

Example 11

An optical member was prepared as in Example 8 except that an aqueous solution of a polymer having a structure formed of succinic anhydride was used.

Comparative Example 9

Hydrophilic Polymer Coating Liquid Film Formation

An appropriate amount of the silicon oxide particle dispersion liquid 2 was dropped onto a 40 mm-square flat quarts substrate (nd=1.47) having a thickness of 3 mm, spin coating was performed at 4000 rpm for 30 seconds, and then the dispersion liquid was heated and cured in a circulating hot air oven at 140° C. for 30 minutes to form an undercoat layer. An appropriate amount of the silicon oxide particle dispersion liquid 1 was dropped onto the undercoat layer, spin coating was performed at 1500 rpm for 30 seconds, and then the dispersion liquid was heated and cured in a circulating hot air oven at 140° C. for 30 minutes to form a moisture-retaining layer. Subsequently, a silicon oxide film, a film formed of a mixture of zirconium oxide and titanium oxide, and a magnesium fluoride film were formed by the same method as in Example 1 so that the thicknesses that take reflectance properties into account were obtained.

Then, an appropriate amount of the hydrophilic polymer coating liquid was dropped thereon, and spin coating was performed at 2000 rpm for 30 seconds to form a hydrophilic polymer layer having a thickness of 25 nm.

Comparative Example 10

An optical member was prepared as in Example 8 except that the hydrophilic polymer layer was not formed, and this optical member was used as a sample of Comparative Example 10. Although this optical member is described as a comparative example here, this optical member is included in the example of the first embodiment, and can be used as an optical member having excellent antireflection properties and antifogging properties comparable to those of Examples 1 to 4 depending on the design of the optical apparatus to which this optical member is loaded.

Comparative Example 11

An optical member was prepared as in Example 8 except that an aqueous solution of a polymer having a silane-modified imine was used.

Comparative Example 12

An optical member was prepared as in Example 8 except that an aqueous solution of a polymer having a hydroxyl group was used.

For Example 8 and Comparative Example 9, the thickness of the hydrophilic polymer layer was evaluated by the following procedure.

An X-ray photoelectron spectroscope (Quantera II produced by ULVAC-PHI, INCORPORATED) was used to measure the thickness of the hydrophilic polymer layer. During the layer thickness measurement, the same analysis was performed 40 times while etching a 2 mm×2 mm square region with an Ar ion beam at an acceleration voltage of 100 V for 15 seconds so as to measure the detection intensity of the element derived from the hydrophilic polymer. After 40 times of etching, the depth of the groove from the surface was measured and found to be about 40 nm, and it was found that the depth of 1 nm was etched in one etching step. Etching was performed multiple times from the surface of the hydrophilic polymer layer, and the number of times etching was performed before the detection intensity of the element derived from the hydrophilic polymer disappeared was multiplied by 1 nm to obtain the thickness of the hydrophilic polymer layer.

The thickness of the hydrophilic polymer layer in Example 8 was 3 nm, and the thickness of the hydrophilic polymer layer in Comparative Example 9 was 25 nm. Table 4 indicates the structure of the optical member of Example 8.

TABLE 4

| | | Refractive index $n_d$ | Film thickness [nm] |
|---|---|---|---|
| Substrate | Quartz | 1.47 | |
| Undercoat layer | Porous film containing spherical silicon oxide particles | 1.33 | 94 |
| Moisture-retaining layer | Porous film containing chain-like silicon oxide particles | 1.24 | 1280 |
| Antireflection layer First layer | Silicon oxide film | 1.46 | 94 |
| Second layer | Film of mixture of zirconium oxide and titanium oxide | 1.96 | 52 |
| Third layer | Silicon oxide film | 1.46 | 10 |
| Fourth layer | Film of mixture of zirconium oxide and titanium oxide | 1.96 | 61 |
| Fifty layer | Magnesium fluoride | 1.38 | 77 |
| Sixth layer | Silicon oxide | 1.46 | 10 |
| Hydrophilic layer | Acryl polymer having a sulfobetaine group | 1.53 | 3 |

Evaluation of Example 8 and Comparative Examples 9 and 10

Figure 9:
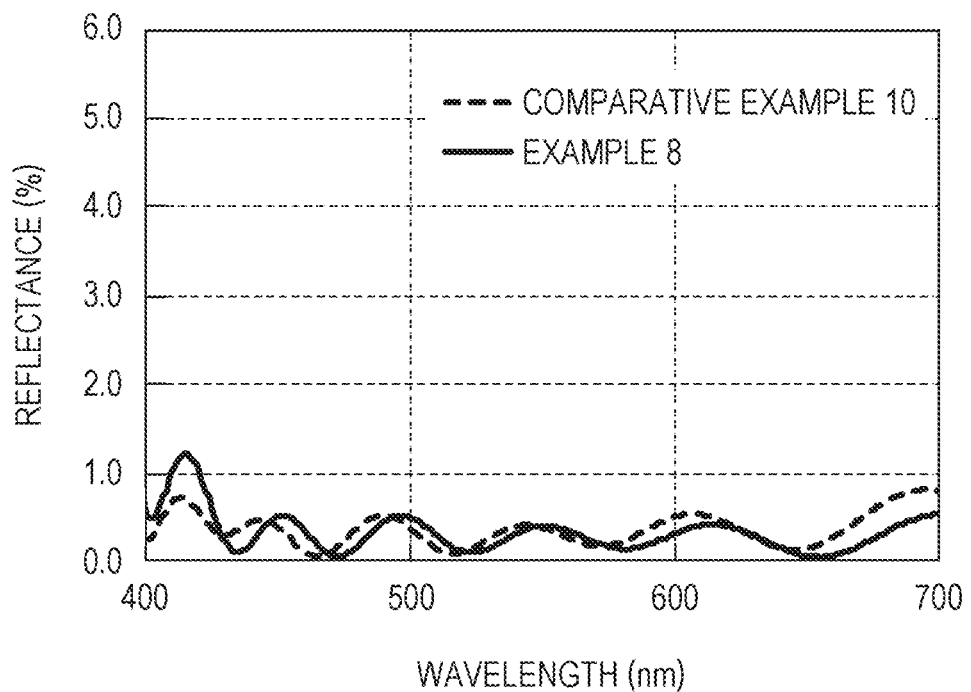
FIG. 9 is a graph indicating the reflectance properties of Example 8 and Comparative Example 10.
Figure 10:
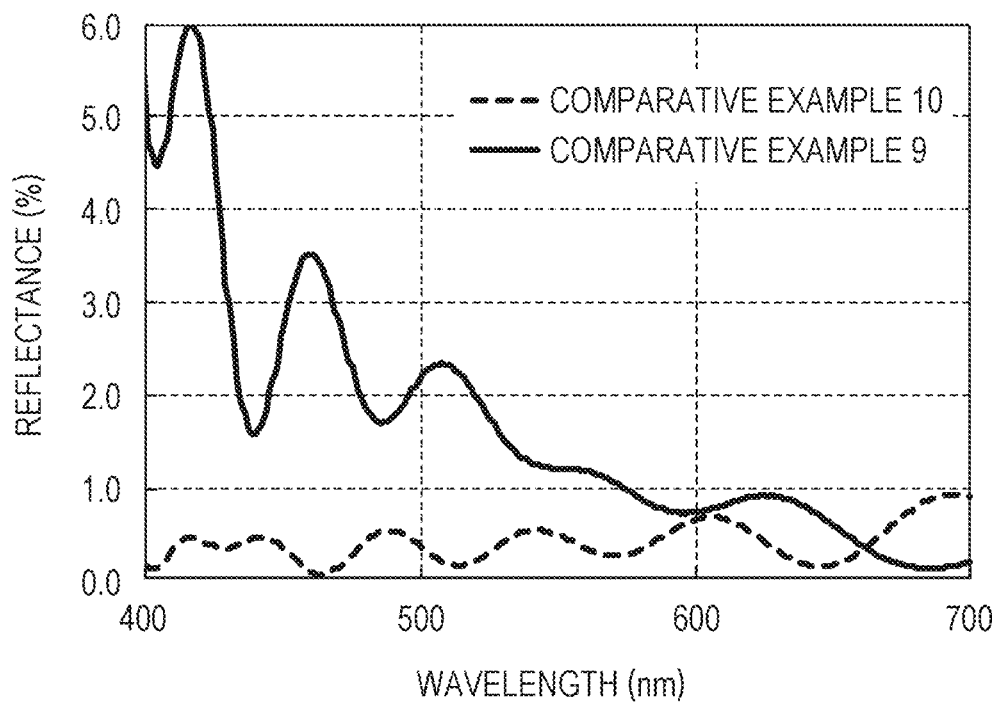
FIG. 10 is a graph indicating the reflectance properties of Comparative Examples 9 and 10.

The reflectance properties of Example 8 and Comparative Example 10 are indicated in FIG. 9, and reflectance properties of Comparative Examples 9 and 10 are indicated in FIG. 10. These results confirmed that the antireflection effects were greatly impaired if the thickness of the hydrophilic polymer layer was 20 nm or more but were not adversely affected as long as the thickness was about 3 nm.

(13) Contact Angle Evaluation

A full automatic contact angle meter (DM-701 produced by Kyowa Interface Science, Inc.) was used to measure the contact angle of the surface to a 2 µl droplet of pure water or hexadecane at 23° C. and 50% RH.

The contact angle to pure water was evaluated by the following standard.

The smaller the contact angle, the better the hydrophilicity.

A: Less than 20°
B: 20° or more but less than 60°
C: 60° or more

(14) Evaluation of Antifogging Properties

By using an antifogging property evaluation apparatus (AFA-2 produced by Kyowa Interface Science, Inc.), a transparent substrate retained at 25° C. was cooled to 15° C. while being left in an atmosphere of 25° C. and 70% RH, and the transmitted image was recorded every second for up to 300 seconds. Compressive antifogging index analysis was performed on the transmitted images, and the compressive antifogging index was plotted versus time. The time taken before the compressive antifogging index started to decrease from the initial value was read off from the obtained plot, and the antifogging properties were evaluated by the following standard. The longer the time taken before the compressive antifogging index started to decrease from the initial value, the better the antifogging properties.

Figure 11:
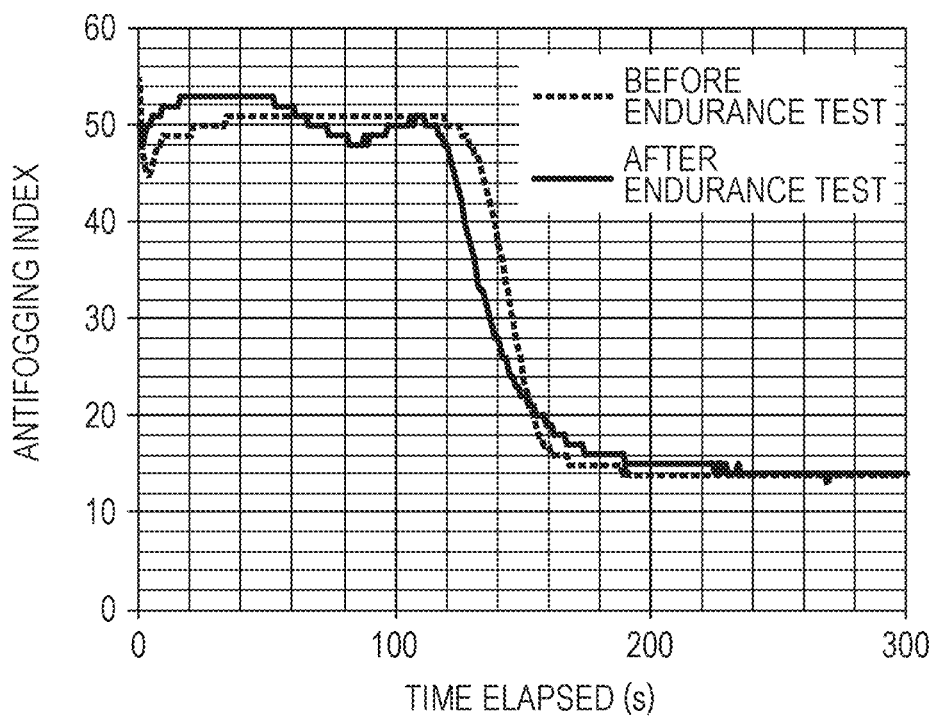
FIG. 11 is a graph indicating changes in compressive antifogging index versus the humidifying time for the optical member of Example 8 before and after the endurance test.
Figure 12:
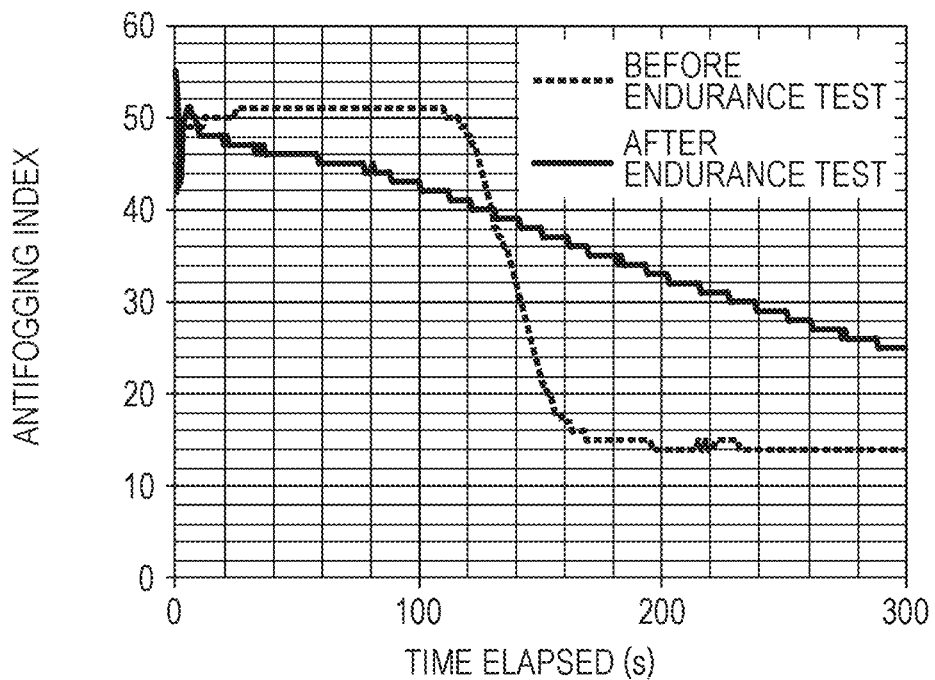
FIG. 12 is a graph indicating changes in compressive antifogging index versus humidifying time for the optical member of Comparative Example 10 before and after the endurance test.

A: 100 seconds or more
B: 80 seconds or more but less than 100 seconds
C: less than 80 seconds FIG. 11 indicates changes in compressive antifogging index versus the humidifying time of the optical member of Example 8 before and after the endurance test, and FIG. 12 indicates changes in compressive antifogging index versus the humidifying time of the optical member of Comparative Example 10 before and after the endurance test. The endurance test involved leaving the optical member in air for one week. The optical member of Example 8 in which a hydrophilic polymer layer was disposed on the surface maintained high antifogging properties before and after the endurance test. In contrast, the optical member of Comparative Example 10 in which a hydrophilic polymer layer was not formed on the surface exhibited excellent antifogging properties before the endurance test, but degradation of the antifogging properties was observed after the endurance test. This was because forming the hydrophilic polymer layer 50 on the surface of the antireflection layer caused the moisture that could not be absorbed by the optical member 100 to form a water film rather than water droplets on the surface.

Table 5 indicates the changes in contact angle and antifogging properties after the endurance test in Examples 8 to 11 and Comparative Examples 10 to 12. The contact angles in Examples 8 to 11 and Comparative Examples 10 to 12 in which a hydrophilic polymer layer was included were all 60° or less before the endurance test and hydrophilicity was exhibited. The contact angle was 60° or less even after the endurance test in Examples 8 to 11. In particular, the contact angle was 15° or less before and after the endurance test in Example 8, and high hydrophilicity was maintained.

In Examples 8 to 11, the optical members did not fog even after 80 seconds in the antifogging property evaluation. In contrast, in Comparative Examples 10 to 12 in which a layer of a hydrophilic polymer having a zwitterionic hydrophilic group was not included, hydrophilicity was lost after the endurance test, and, in the antifogging property evaluation, the optical member cooled to 15° C. began to fog within 80 seconds after being put in an environment of 25° C. and 70% RH and visibility gradually degraded.

TABLE 5

| | Zwitterionic polymer Ion group | Before endurance test Contact angle [°] | Before endurance test Antifogging property [sec] | After endurance test Contact angle [°] | After endurance test Antifogging property [sec] | Evaluation Contact angle Initial | Evaluation Contact angle After endurance | Evaluation Antifogging property Initial | Evaluation Antifogging property After endurance | Comprehensive evaluation |
|---|---|---|---|---|---|---|---|---|---|---|
| Example 8 | Betaine sulfonate | 7 | 120 | 7 | 112 | A | A | A | A | A |
| Example 9 | Sulfonic acid | 5 | 123 | 39 | 97 | A | B | A | B | B |
| Example 10 | Sodium phosphonate | 6 | 120 | 41 | 94 | A | B | A | B | B |
| Example 11 | Succinic anhydride | 34 | 110 | 52 | 85 | B | B | A | B | B |
| Comparative Example 10 | — | 12 | 121 | 61 | 22 | A | C | A | C | C |
| Comparative Example 11 | Silane-modified imine | 54 | 105 | 61 | 61 | B | C | A | C | C |
| Comparative Example 12 | Hydroxyl group | 30 | 110 | 70 | 10 | B | C | A | C | C |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-103232, filed 31 May, 2019 and No. 2020-060798, filed Mar. 30, 2020, which are hereby incorporated by reference herein in their entirety.

What is claimed is:

1. An optical member comprising, in sequence:
   a substrate;
   a porous layer; and
   a multilayered antireflection layer,
   wherein a ratio $n/n_0$ is 0.85 or more and 0.95 or less, where n represents a refractive index of a layer having the highest refractive index among layers included in the antireflection layer and $n_0$ represents a refractive index of a compound constituting the layer having the highest refractive index at a theoretical density.

2. The optical member according to claim 1, wherein the refractive index of the layer having the highest refractive index among the layers included in the antireflection layer is 1.8 or more.

3. The optical member according to claim 2, wherein the antireflection layer includes a layer having a refractive index of 1.4 or more and less than 1.8.

4. The optical member according to claim 2, wherein the antireflection layer includes a layer having a refractive index of less than 1.4.

5. The optical member according to claim 4, wherein the layer having a refractive index of less than 1.4 is positioned in the antireflection layer so as to be farthest from the substrate.

6. The optical member according to claim 5, wherein the layer having a refractive index of less than 1.4 has a plurality of columnar structures at an interface with an adjacent layer, the columnar structures having a height of 27% or more of a thickness of the layer having a refractive index of less than 1.4.

7. The optical member according to claim 6, wherein the plurality of columnar structures are arranged at an average pitch of 60 nm or less.

8. The optical member according to claim 1, wherein the porous layer includes pores having an average pore diameter of 3 nm or more and 50 nm or less.

9. The optical member according to claim 1, wherein the porous layer includes pores having an average pore diameter of 5 nm or more and 20 nm or less.

10. The optical member according to claim 1, wherein the porous layer includes pores having a pore volume of 0.1 $cm^3/g$ or more and 1.0 $cm^3/g$ or less.

11. The optical member according to claim 10, wherein the porous layer includes pores having a pore volume of 0.3 $cm^3/g$ or more and 0.6 $cm^3/g$ or less.

12. The optical member according to claim 1, wherein the porous layer contains a plurality of metal oxide particles.

13. The optical member according to claim 12, wherein the metal oxide particles are silicon oxide particles.

14. The optical member according to claim 1, further comprising an undercoat layer disposed between the substrate and the porous layer.

15. The optical member according to claim 14, wherein the undercoat layer is a layer having a refractive index between a refractive index of the substrate and a refractive index of the porous layer, or a layered body formed of a plurality of layers having different refractive indices.

16. The optical member according to claim 1, further comprising a hydrophilic polymer layer on a surface of the antireflection layer, the hydrophilic polymer layer having a thickness of 1 nm or more and 20 nm or less and having a zwitterionic hydrophilic group.

17. The optical member according to claim 16, wherein the zwitterionic hydrophilic group is a member selected from the group consisting of a sulfobetaine group, a carbobetaine group, a phosphorylcholine group, a sulfone group, a phosphonate group, and a carboxylic anhydride.

18. An optical apparatus comprising:
   a casing; and
   an optical system disposed in the casing, the optical system including a plurality of lenses,
   wherein at least one of the lenses includes, in sequence, a substrate, a porous layer, and a multilayered antireflection layer, and a ratio $n/n_0$ is 0.85 or more and 0.95 or less, where n represents a refractive index of a layer having the highest refractive index among layers included in the antireflection layer and $n_0$ represents a refractive index of a compound constituting the layer having the highest refractive index at a theoretical density.

19. An imaging apparatus comprising:

a casing;

an optical system disposed in the casing, the optical system including a plurality of lenses; and an imaging device that receives light that has passed through the optical system, wherein at least one of the lenses includes, in sequence, a substrate, a porous layer, and a multilayered antireflection layer, and a ratio $n/n_0$ is 0.85 or more and 0.95 or less, where n represents a refractive index of a layer having the highest refractive index among layers included in the antireflection layer and $n_0$ represents a refractive index of a compound constituting the layer having the highest refractive index at a theoretical density.

20. A method for manufacturing an optical member, the method comprising:

a step of forming a porous layer by supplying, onto a substrate, a liquid containing particles, a component that forms a binder, and a solvent; and a step of forming a multilayered antireflection layer on the porous layer, wherein, in the step of forming an antireflection layer, a layer having the highest refractive index among layers included in the antireflection layer is formed by a vapor deposition process so that a ratio $n/n_0$ is 0.85 or more and 0.95 or less, where n represents the refractive index of the layer having the highest refractive index among layers included in the antireflection layer and $n_0$ represents a refractive index of a compound constituting the layer having the highest refractive index at a theoretical density.

21. The method according to claim 20, wherein the layer having the highest refractive index is formed by unheated deposition or oblique deposition.

22. The method according to claim 21, further comprising a step of forming a hydrophilic polymer layer by supplying, onto the antireflection layer, a solution containing a compound that contains a zwitterionic hydrophilic functional group.

23. The method according to claim 22, wherein the zwitterionic hydrophilic functional group is a member selected from the group consisting of a sulfobetaine group, a carbobetaine group, a phosphorylcholine group, a sulfone group, a phosphonate group, and a carboxylic anhydride.

24. The method according to claim 20, wherein the particles are silicon oxide particles, and the component that forms a binder is a solution containing a silicon oxide compound.

* * * * *